US00RE47733E

(19) United States
(12) Reissued Patent
West

(10) Patent Number: US RE47,733 E
(45) Date of Reissued Patent: Nov. 19, 2019

(54) METHOD AND APPARATUS FOR MOUNTING PHOTOVOLTAIC MODULES

(75) Inventor: John Raymond West, San Rafael, CA (US)

(73) Assignee: Tesla, Inc., Palo Alto, CA (US)

(21) Appl. No.: 13/241,199

(22) Filed: Sep. 22, 2011

Related U.S. Patent Documents

Reissue of:
(64) Patent No.: 7,592,537
Issued: Sep. 22, 2009
Appl. No.: 11/053,524
Filed: Feb. 7, 2005

U.S. Applications:
(60) Provisional application No. 60/568,513, filed on May 5, 2004, provisional application No. 60/542,463, filed on Feb. 5, 2004.

(51) Int. Cl.
*H02N 6/00* (2006.01)
*F24J 2/52* (2006.01)
(Continued)

(52) U.S. Cl.
CPC ..... *H02S 20/00* (2013.01); *F24S 25/20* (2018.05); *F24S 25/61* (2018.05); *F24S 25/632* (2018.05);
(Continued)

(58) Field of Classification Search
CPC ..... F24J 2/5262; F24J 2/5211; H02S 20/23; H02S 20/00; F24S 25/67; F24S 25/65;
(Continued)

(56) References Cited

U.S. PATENT DOCUMENTS 3,630,253 A 12/1971 Sherman
4,047,516 A 9/1977 Bruel
(Continued)

FOREIGN PATENT DOCUMENTS

DE 3111969 10/1982
DE 44 44 439 A1 4/1995
(Continued)

OTHER PUBLICATIONS

US 5,819,447 A, 10/1998, Yamawaki (withdrawn)
(Continued)

*Primary Examiner* — Jeffrey L Gellner
(74) *Attorney, Agent, or Firm* — Kilpatrick Townsend & Stockton LLP

(57) ABSTRACT

An interlocking photovoltaic module mounting system that provides a one piece, integrated photovoltaic module frame portion that is directly mountable to a support structure and interlocks with separate adjoining photovoltaic module frame portions. The apparatus includes a frame member for enclosing the perimeter of a photovoltaic module, having an inside surface and outside surface, with the inside surface including a recess for capture of the panel. The frame member outside surface includes at least one interlocking means for affixation to the complementary outside surface of an adjacent frame-member. The frame member includes a height-adjustable foot portion for supporting the frame member on a roof, so that adjacent frame members may be interlocked to form an array, and the foot portion may be adjusted to level the formed array on the roof.

133 Claims, 7 Drawing Sheets

(51) Int. Cl.

| | |
|---|---|
| ***H02S 20/00*** | (2014.01) |
| ***H02S 20/23*** | (2014.01) |
| ***F24S 25/61*** | (2018.01) |
| ***F24S 25/67*** | (2018.01) |
| ***F24S 25/20*** | (2018.01) |
| ***F24S 25/65*** | (2018.01) |
| ***F24S 25/632*** | (2018.01) |
| *F24S 25/60* | (2018.01) |

(52) U.S. Cl.
CPC ..... *F24S 25/65* (2018.05); *F24S 25/67* (2018.05); *H02S 20/23* (2014.12); *F24S 2025/6006* (2018.05); *Y02B 10/12* (2013.01); *Y02B 10/20* (2013.01); *Y02E 10/47* (2013.01); *Y02E 10/50* (2013.01)

(58) Field of Classification Search
CPC .... F24S 25/20; F24S 25/61; F24S 2025/6006; Y02B 10/12; Y02B 10/20; Y02E 10/50; Y02E 10/47
USPC ..... 136/251
See application file for complete search history.

(56) References Cited

U.S. PATENT DOCUMENTS 4,112,922 A 9/1978 Skinner
4,146,785 A 3/1979 Neale
4,154,223 A 5/1979 Lof
4,155,346 A * 5/1979 Aresty ..... F24J 2/055 126/652
4,215,677 A 8/1980 Erickson
4,217,825 A 8/1980 Bruckner
4,219,011 A 8/1980 Knoos
4,246,892 A 1/1981 Waiche
4,271,825 A 6/1981 Schwob et al.
4,308,858 A 1/1982 Skillman
4,310,182 A 1/1982 Vandenbossche
4,312,325 A 1/1982 Voges
4,336,413 A 6/1982 Tourneux
4,353,356 A 10/1982 Vandenbossche
4,371,139 A 2/1983 Clark
4,392,009 A 7/1983 Napoli
4,429,872 A 2/1984 Capachi
4,505,261 A 3/1985 Hunter
4,570,408 A 2/1986 Frascaroli
4,636,577 A 1/1987 Peterpaul
4,691,818 A 9/1987 Weber
4,718,185 A 1/1988 Conlin
4,966,631 A 10/1990 Matlin
5,046,791 A 9/1991 Kooiman
5,127,762 A 7/1992 Havlovitz
5,134,827 A 8/1992 Hartman
5,143,556 A 9/1992 Matlin
5,144,780 A 9/1992 Gieling
5,164,019 A 11/1992 Sinton
5,164,020 A 11/1992 Wagner
5,203,135 A 4/1993 Bastian
5,205,694 A 4/1993 Nagoshi et al.
5,232,518 A 8/1993 Nath
5,316,592 A 5/1994 Dinwoodie
5,333,602 A 8/1994 Huang
5,338,369 A 8/1994 Rawlings
5,460,660 A 10/1995 Albright et al.
5,497,587 A 3/1996 Hirai
5,505,788 A 4/1996 Dinwoodie
D374,169 S 10/1996 Kopish
5,571,338 A 11/1996 Kadanome et al.
5,596,981 A 1/1997 Soucy
5,628,580 A 5/1997 Rinderer
D387,655 S 12/1997 Kopish
5,706,617 A 1/1998 Hirai
5,746,029 A 5/1998 Ullman
5,746,839 A 5/1998 Dinwoodie
5,787,653 A 8/1998 Sakai
5,960,790 A 10/1999 Rich
6,061,978 A 5/2000 Dinwoodie
6,093,884 A 7/2000 Toyomura
6,105,317 A 8/2000 Tomiuchi et al.
6,111,189 A 8/2000 Garvison
6,148,570 A 11/2000 Dinwoodie
6,201,180 B1 3/2001 Meyer
6,207,889 B1 3/2001 Toyomura
6,242,685 B1 6/2001 Mizukami et al.
6,269,596 B1 8/2001 Ohtsuka
6,274,402 B1 8/2001 Verlindon
6,295,918 B1 10/2001 Ansley
6,313,395 B1 11/2001 Crane
6,336,304 B1 1/2002 Mimura et al.
6,337,283 B1 1/2002 Verlindon
6,360,491 B1 3/2002 Ullman
6,370,828 B1 4/2002 Genschorek
6,387,726 B1 5/2002 Verlindon
6,414,237 B1 7/2002 Boer
6,423,568 B1 7/2002 Verlindon
6,465,724 B1 10/2002 Garvison et al.
6,495,750 B1 12/2002 Dinwoodie
6,501,013 B1 12/2002 Dinwoodie
6,523,320 B2 2/2003 Stoof
6,534,702 B1 3/2003 Makita
6,534,703 B2 3/2003 Dinwoodie
6,568,873 B1 5/2003 Peterson
6,570,084 B2 5/2003 Dinwoodie
6,586,668 B2 7/2003 Shugar
6,606,830 B2 8/2003 Nagao et al.
6,634,077 B2 * 10/2003 Layfield ..... 29/525.13
6,670,541 B2 * 12/2003 Nagao ..... H01L 31/02008 136/244
6,672,018 B2 1/2004 Shingleton
6,675,545 B2 1/2004 Chen
6,675,580 B2 1/2004 Ansley
6,676,326 B2 1/2004 Wu
6,761,008 B2 1/2004 Chen
6,722,357 B2 4/2004 Shingleton
6,784,360 B2 8/2004 Nakajima
6,809,251 B2 10/2004 Dinwoodie
6,809,253 B2 10/2004 Dinwoodie
6,935,623 B2 8/2005 Cook
D510,315 S 11/2005 Shugar
D511,576 S 11/2005 Shingleton
6,959,517 B2 11/2005 Poddany et al.
D516,017 S 2/2006 Mascolo
6,993,917 B2 2/2006 Unger
D519,444 S 4/2006 Mascolo
7,043,884 B2 5/2006 Moreno
7,172,184 B2 2/2007 Pavani et al.
7,297,867 B2 11/2007 Nomura
D562,225 S 2/2008 Almy et al.
7,328,534 B2 2/2008 Dinwoodie
D564,958 S 3/2008 Almy et al.
7,339,110 B1 3/2008 Mulligan
D565,505 S 4/2008 Shugar
7,406,800 B2 8/2008 Cinnamon
7,435,134 B2 10/2008 Lenox
7,435,897 B2 10/2008 Russell
7,634,875 B2 12/2009 Genschorek
7,774,998 B2 8/2010 Aschenbrenner
7,866,098 B2 1/2011 Cinnamon
7,915,519 B2 3/2011 Kobayashi
7,987,641 B2 8/2011 Cinnamon
8,109,048 B2 2/2012 West
2002/0046506 A1 4/2002 Ullman
2002/0078991 A1 6/2002 Nagao et al.
2002/0112435 A1 * 8/2002 Hartman ..... E04B 7/024 52/648.1
2002/0193001 A1 12/2002 Yoshikawa et al.
2003/0010372 A1 1/2003 Dinwoodie
2003/0015636 A1 1/2003 Liebendorfer
2003/0015637 A1 1/2003 Liebendorfer
2003/0070368 A1 4/2003 Shingleton
2003/0175071 A1 9/2003 Layfield
2003/0201009 A1 * 10/2003 Nakajima et al. ..... 136/251
2004/0063265 A1 4/2004 Noble

(56) References Cited

U.S. PATENT DOCUMENTS

| | | | |
|---|---|---|---|
| 2004/0163338 | A1 | 8/2004 | Liebendorfer |
| 2004/0179892 | A1 | 9/2004 | Du Preez |
| 2005/0115176 | A1 | 6/2005 | Russell |
| 2005/0199278 | A1 | 9/2005 | Aschenbrenner |
| 2005/0257453 | A1 | 11/2005 | Cinnamon et al. |
| 2006/0005875 | A1 | 1/2006 | Haberlein |
| 2006/0042680 | A1 | 3/2006 | Korman et al. |
| 2006/0118163 | A1 | 6/2006 | Plaisted |
| 2007/0074755 | A1 | 4/2007 | Eberspacher et al. |
| 2007/0079865 | A1 | 4/2007 | Warfield et al. |
| 2007/0102036 | A1 | 5/2007 | Cinnamon |
| 2007/0144575 | A1 | 6/2007 | Mascolo |
| 2007/0151594 | A1 | 7/2007 | Mascolo |
| 2007/0157963 | A1 | 7/2007 | Metten et al. |
| 2008/0000173 | A1 | 1/2008 | Lenox et al. |
| 2008/0029144 | A1 | 2/2008 | Brazier et al. |
| 2009/0025314 | A1 | 1/2009 | Komamine |
| 2009/0078299 | A1 | 3/2009 | Cinnamon et al. |
| 2009/0095280 | A1 | 4/2009 | Buller et al. |
| 2010/0147362 | A1 | 6/2010 | King et al. |

FOREIGN PATENT DOCUMENTS

| | | | | |
|---|---|---|---|---|
| DE | 2970348 | | 11/1997 | |
| DE | 19906464 | A1 | 8/2000 | |
| DE | 102005002828 | | 8/2006 | |
| EP | 1 783 440 | A2 | 5/2007 | |
| GB | 2391704 | | 2/2004 | |
| JP | 47-023570 | | 7/1971 | |
| JP | 47-057885 | | 5/1972 | |
| JP | 57-087561 | | 1/1982 | |
| JP | 57-077856 | | 5/1982 | |
| JP | 57087561 | A * | 6/1982 | |
| JP | 58-133945 | | 9/1983 | |
| JP | 59-191748 | | 12/1984 | |
| JP | 02-42449 | | 3/1990 | |
| JP | 04-052367 | | 2/1992 | |
| JP | 06-41156 | | 5/1994 | |
| JP | 06-069527 | A | 11/1994 | |
| JP | 07-202242 | | 8/1995 | |
| JP | 08-296311 | | 11/1996 | |
| JP | 08296311 | A * | 11/1996 | ..... 136/243 |
| JP | 10-176403 | | 6/1998 | |
| JP | 10159284 | A * | 6/1998 | ..... 136/243 |
| JP | 10-266499 | * | 10/1998 | |
| JP | 10-317619 | | 12/1998 | |
| JP | 10-317621 | | 12/1998 | |
| JP | 11-002004 | | 1/1999 | |
| JP | 11-002011 | | 1/1999 | |
| JP | 11-006262 | | 1/1999 | |
| JP | 11-040835 | | 2/1999 | |
| JP | 11-222991 | | 8/1999 | |
| JP | 11222991 | A * | 8/1999 | |
| JP | 2000-150947 | | 5/2000 | |
| JP | 2000-345664 | * | 12/2000 | |
| JP | 2000345664 | | 12/2000 | |
| JP | 2000345664 | A * | 12/2000 | |
| JP | 2001-148493 | | 5/2001 | |
| JP | 2001-210853 | | 8/2001 | |
| JP | 2002-141541 | | 5/2002 | |
| JP | 2002-294957 | | 10/2002 | |
| JP | 2003-227207 | | 8/2003 | |
| JP | 10-159284 | | 6/2008 | |
| WO | WO2005116359 | | 12/2005 | |
| WO | WO 2007103882 | | 9/2007 | |
| WO | WO2010/074701 | | 7/2010 | |

OTHER PUBLICATIONS

Solarex VLX PV Module, circa 1993.
Solyndra 200 Series datasheet, released Apr. 1, 2011.
Unirac Technical Bulletin 103, May 2002.
Unirac Installation Manual 210, 2003.
T. Yamawaki, Exterior heat insulating structure for roof floor, Dec. 12, 2000, JPO, online translation.*
K. Yamada, Fixing structure of natural lighting body, Aug. 17, 1999, JPO online translation.*
Machine translation of JP10159284A.*

* cited by examiner

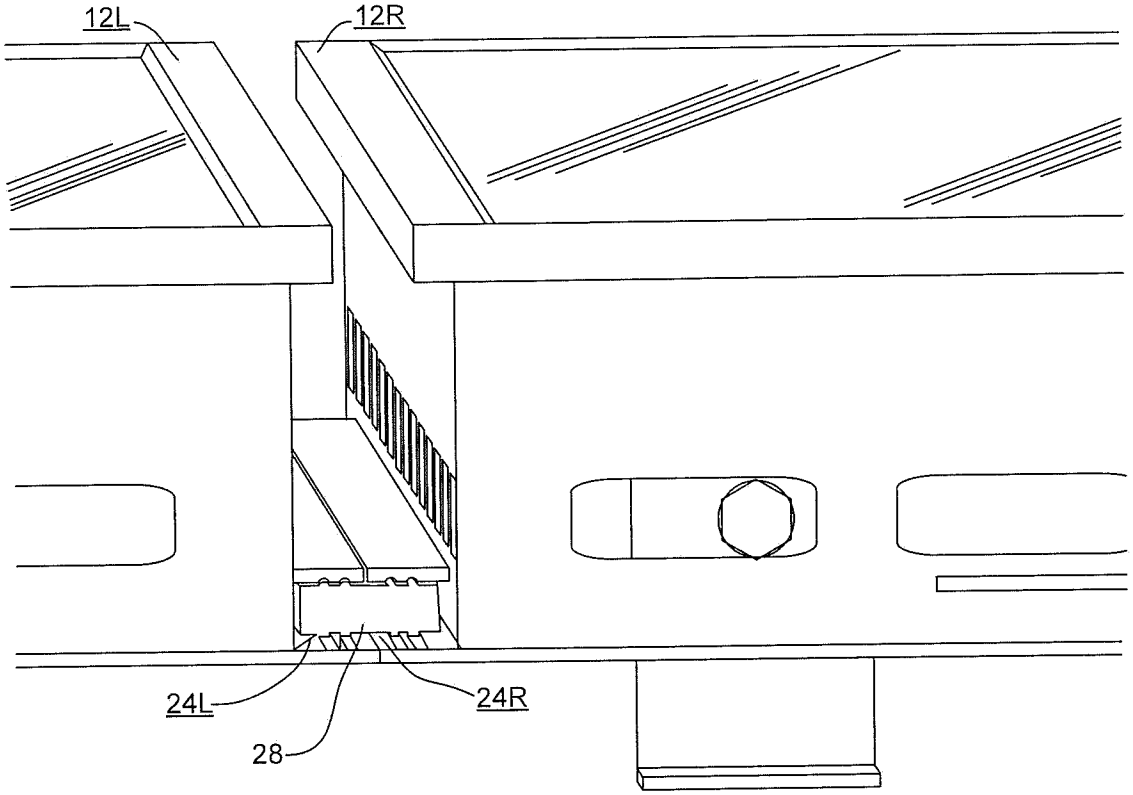
FIG. 7
(AMENDED)

METHOD AND APPARATUS FOR MOUNTING PHOTOVOLTAIC MODULES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application claims the benefit of the filing date of U.S. Provisional Patent Application Ser. No. 60/542,463, filed 5 Feb. 2004, and U.S. Provisional Patent Application Ser. No. 60/568,513, filed May 5, 2004.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to photovoltaic modules and associated frames and mounting hardware, and more particularly to an interlocking photovoltaic module mounting system that provides a one piece, integrated photovoltaic module frame that is directly mountable to a support structure and interlocks with separate adjoining photovoltaic module frames.

BACKGROUND INFORMATION AND DISCUSSION OF RELATED ART

Photovoltaic (PV) modules and related mounting hardware are well known and in widespread use. The most common mass-produced PV modules in use today include a laminated portion, or PV laminate, and a frame portion, and are designed specifically to convert light into electricity. The PV laminate portion is for encapsulating solar cells in a substantially flat, weather-tight envelope comprising a laminated construction of various layers including but not limited to glass, clear plastic, encapsulant material (like EVA), active photovoltaic material, interconnecting conductors between solar cells, and a protective backsheet (like PVF film). Photovoltaic laminates are commonly manufactured today in rectilinear shapes like squares, rectangles, triangles, and trapezoids and, due to their fragile nature, are usually completely enclosed by a permanent, substantially rigid, glued-on frame portion which holds and protects the delicate edges of the PV laminate portion and provides a means of attaching the PV laminate to other objects without damaging the PV laminate. The combination of the PV laminate portion and the glued-on frame portion is referred to herein as a PV module or framed PV module. The present invention relates to integral glued-on frames for standard PV laminates as are currently being produced, and to the associated mounting hardware which attaches to the integral frames for the purpose of securing the PV module to a roof or support structure.

Since PV cells are typically optimized to produce electricity most efficiently from direct sunlight, most PV modules are mounted outdoors on roofs or support structures. There are two primary methods utilized to reliably mount PV cells in the sun: (a) attach a standard framed PV module to a building, vehicle, or structure, or (b) integrate an unframed, PV laminate into a standard type of building material like a roofing product (shingle, tile, etc.), curtain wall, or a skylight framing system such that the PV laminate forms a part of the weather-tight skin of the building.

The latter approach is commonly referred to as "Building Integrated PV" and is not the subject of this invention. While there have been a number of recent developments in the field of building integrated photovoltaics, there are still very few installations because of their complex building design issues, higher costs, difficult ventilation issues (PV cells operate more efficiently with adequate air flow for cooling), problematic servicing issues (when a cell, laminate, or wiring connection fails), and inability to work well in retrofit applications.

Physical mounting issues associated with the installation of standard, framed photovoltaic modules include the following:

Alignment: Most photovoltaic systems are mounted on roofs and or structures which are not truly flat or straight despite the original design on paper (due to inherent deflection and flaws in materials). PV module alignment (in all three dimensions) is the biggest issue that photovoltaic installers face. The glass on photovoltaic modules heavily amplifies the normal dips and peaks that exist on roofs and structures. If the PV array is not straight, it is very noticeable from the ground. Typical variance is 2" maximum in any one section of a roof, though over a large roof, it may sag by up to 4". Alignment issues have typically been dealt with during installation by attaching multiple framed PV modules to several struts or channels and then attaching the struts or channels to separate foot-type pieces which include adjustable height provisions like slots or holes at different heights. Since this technique results in significantly less adjustability points than if the alignment features were built into the PV module frame, the result is that PV installers frequently spend hours just working on the alignment and generally have to eventually settle for an array which is only partially aligned and in many cases substantially non-planar.

Grounding: The 2002 National Electric Code Article 690.43 allows grounding modules by either a grounding conductor (as is typically done) or by making electrical contact with a metal rack or support structure. Given the importance of grounding for lightning protection and personnel safety, most respectable installers run large #6 ground wires to every module—a very time consuming and tedious task which still doesn't properly ground the array unless ground wires are also run to all struts and metal supports (hardly ever done because it requires threading each strut). Using the mounting structure as the ground is generally not done, primarily because it is somewhat vague in the code and installers don't know how to make lasting "electrical contact" on a structure exposed to the weather (for example, standard, self-tapping screws are not allowed). This is a major problem area because most photovoltaic arrays are not properly grounded.

Wiring: The most common wiring mistake that happens is a missed or improperly connected electrical connector between two modules (almost all photovoltaic modules now come with quick-connect, plug-type connectors for simplified and fast wiring). Even though the development of plug-type connectors have improved intermodule wiring, getting back into the middle of an array to physically reach the wiring and fix a problem can be a time-consuming process, particularly with some mounting systems. In many cases the entire row of PV modules plus all of the large ground wires plus wire strapping must be removed just to locate the problem area. Most roof mounted PV modules are mounted within 6" of a roof surface and in the same plane, so if wiring is beneath the modules or inside the module frames, it is not easily accessible once installed.

Connecting to rafters: It is generally accepted that photovoltaic modules should be secured to the rafters, or other primary structural members (purlins, joists, etc.) for structural integrity and prevention of leaks, as opposed to screwing modules down to the sheathing. A single, typical aluminum framed PV module can expand and contract under normal temperature fluctuations by as much as 1/16" and a whole 60' long array by as much as 1". If the array is only secured into the roof sheathing, then expansion and contraction over time will break the seal and create roof leaks. This issue is typically handled by use of additional struts or channels (since module edges or mounting holes rarely line up with rafters).

Collection of debris: If there are trees around, then debris (and sometimes small animals) will collect beneath modules. Some contractors prefer mounting modules higher to allow easy access for cleaning.

Water damming: Anything long and horizontal directly mounted right down on a roof is a potential leak site because water will dam up there. Roof mounted PV modules must be off of the roof, or building integrated PV s must be utilized.

Module temperature: Photovoltaic modules become less efficient the hotter they get. It is therefore required to provide some airflow beneath the modules if more efficient operation is desired. While airflow is not generally a problem on ground mounted structures and racks, roof mounted PV arrays generally perform much better when elevated off of the roof surface (as opposed to being mounted directly down on the roof surface).

Penetrations: Despite the incredible reliability of advanced roof sealants, PV contractors always want to minimize the number of penetrations that have to be drilled through the roofing surface since they are the ones who are liable for roof leaks. This is typically addressed by the use of additional struts or channels which serve to span multiple PV modules thereby minimizing the number of penetrations required.

Ease of installation: Though most people agree that PV systems provide the most environmentally sound method of producing electricity, the high capital cost of PV systems still prevents most people from being able to afford them.

Aesthetic mounting issues associated with the installation of photovoltaic modules include the following:

Module height: The generally agreed upon aesthetic that most homeowners and architects subscribe to assumes that photovoltaic modules should be either not viewable from the street, or if they are, they should be close to the roof and stand out as little as possible. Given this scenario, any ability to see beneath modules is not good, and insistence on optimum orientation (for example turning and/or tilting modules toward south when in the northern hemisphere on a roof or structure which does not face south) should be avoided. Generally speaking, the PV array should be as close to the same plane as the surface to which it is being mounted. Stated differently: the photovoltaic array should look like one large skylight. While some systems are capable of locating PV modules close to the roof, they generally require some offset from the roof and thus do not look like a skylight. This issue is slightly complicated because heating, debris, and water damming concerns all require an offset, while aesthetic concerns dictate a minimization of height.

Gaps between modules: The tighter the spacing, the better in order to minimize the view of the roof between PV modules and attain a skylight-like appearance.

Hiding other gear: Mounting hardware (like rails, hold-downs, or feet), junction boxes, conduit, wiring, and balance-of-system gear is unsightly, and should be neatly tucked away somewhere out of sight, especially from the street.

Module and frame color: Most homeowners and architects prefer black or dark bronze since these colors tend to draw the least amount of attention to themselves.

Numerous attempts have been made to address these problems, but most have been in the context of costly and cumbersome non-integral mounting hardware, such as improved PV strut systems with specialized "hold-down" pieces that connect the frame portions of PV modules to the strut or by utilizing building integrated techniques. Though the additional hardware developments have provided solutions to enough of the problems to become the dominant technique, many of the issues discussed remain unaddressed. Building integrated solutions also solve some of the problems but come with a host of new problems as discussed above.

Prior art examples include U.S. Pat. No. 6,672,018 to Shingleton which discloses a PV laminate mounting method and clip wherein a solar collector array is formed of a plurality of PV laminates mounted on a frame made of support beams which may be sheet metal channel members. A butyl tape or other glazing material is applied between the back laminate of the solar panel and the beam. Clips are used to clamp the panels to the support beams. The clips have an upper portion that is generally T-shaped in profile, and a retainer in the form of a channel nut or bar, with a threaded hole that receives a bolt or similar threaded fastener. The retainer biases against the inwardly directed flanges of the channel support beam. Electrical wires and mechanical fasteners are concealed within the support beams.

While this design does eliminate costly and unnecessary materials, it creates a new series of problems: fragile edges of the laminate are exposed and likely to break during normal-installation and/or roof maintenance, the system does not provide any means for vertical adjustability and will therefore include rows of PV laminates at differing heights which will compromise the aesthetic appeal, use of adhesive directly on the laminate means that removal of a single or multiple laminates may be difficult or impossible in some cases, thereby greatly reducing the maintenance capabilities of the system, and since PV systems are typically designed to last at least 30 years, the use of an adhesive which is exposed to the weather and under extreme daily temperature fluctuations is of questionable long term reliability.

U.S. Pat. No. 6,606,830 to Nagao et al. describes a building integrated photovoltaic roof including a roof base member provided on a partition wall which partitions a building into an indoor portion and an outdoor portion, a solar cell module provided on the roof base member, and electric wiring with one end portion being electrically connected with the solar cell module. The end portion of the electric wiring is drawn to the outside from between the roof base member and the solar cell module and at an outdoor-sided position than an indoor side face of the partition wall.

U.S. Pat. No. 6,465,724 to Garvison et al. teaches a photovoltaic module framing system with integral electrical raceways wherein a multi-purpose photovoltaic module framing system is provided which combines and integrates the framing system with the photovoltaic electrical system. The frame includes at least one rail which receives fasteners to directly mount the module on or to a roof, wall, rack, beam, or other structure. The frame has portions to space the PV module above a roof, so as to form a gap between the module and the roof to channel water, as well as to provide an air passage to cool the module. The frame includes portions that hold the PV laminate and for mechanically mounting the frame to a support structure. The PV modules are also overlapping interleaving side rails between intermediate PV modules and outboard PV modules. The overlapping, interleaving side rails can have a regular or inverted C-shaped or bracket shaped cross section with: (a) overlapping upper side flanges, which extend laterally outwardly from upper portions of the modules, (b) overlapping lower side flanges, which provide feet that extend laterally outward from lower portions of the modules, and (c) an intermediate side bight which provides a side crossbar that extends between and integrally connects the overlapping upper and lower side flanges. The bottom exterior surfaces of the feet can abut against and engage the shingles of an asphalt shingle roof. The multi-purpose frames also have integral electrical raceways which conceal and protect most electrical components and wires. The reliable frames are specially constructed and arranged to permit easy access to output wires and do not require junction boxes. Ground clips can be directly connected to the convenient framing system.

While this attempt does solve a number of the problems outlined, it has the following major faults which have significantly impeded adoption: (a) the lag bolts go through pre-defined holes which means that the lag bolts in most cases will have to be screwed into the sheathing, missing rafters and therefore causing roof leaks; (b) there is no vertical adjustability so the sides which abut each other will be not be level with each other in most cases (since roofs are not flat) dramatically diminishing the aesthetic appeal of the PV array; (c) design is not backwardly compatible with the common inward facing flange integral frame and thus requires contractors to completely re-tool and learn a totally different product which impedes adoption of the invention; (d) can't remove a module from the middle if it breaks without painstakingly removing the whole row; (e) it requires three different types of extrusions per PV module which means triple the cost for tooling to manufacture the unit as compared to a design with only one type of extrusion; and (f) design only allows for PV modules mounted in portrait orientation (long dimension of the module running perpendicular to the roof ridge), yet most roofs can actually fit more PV modules in landscape orientation since the long dimension of the module is now parallel with the long dimension of the roof (most roofs are longer side to side than they are from ridge to gutter). Regarding the maintenance issues, if you do have to remove modules for service, you have to literally rip up all of the now dried roof sealant and pull lag bolts out of the sheathing—a very time consuming process. Or worse yet, if a module or wiring connection is suspected to be faulty right after initial installation (the most likely time to discover a problem), then modules will have to be removed exposing wet sealant and causing a mess. To avoid the sealant problems mentioned above, the only option would be to use an inferior type of sealant like butyl tape which no experienced PV contractor would want to do because of roof leak liability.

U.S. Pat. No. 6,414,237 to Boer discloses solar collectors, articles for mounting solar modules, and methods of mounting solar modules, including a solar collector comprising at least one solar module; at least one solar module frame which supports the solar module; and at least one solar module bracket comprising a profile channel engagement hook, the profile channel engagement hook comprising a neck portion and a foot portion, the foot portion having a foot portion cross-sectional area in a first plane which is larger than a cross-sectional area of the neck portion in a second plane parallel to the first plane. There is also provided a profile channel attached to or integral with a support structure, the profile channel having at least one opening, the profile channel engagement hook engaging the opening such that the neck portion extends through the opening. There are also provided methods of making such solar collectors and methods of mounting such solar collectors on support structures.

U.S. Pat. No. 6,336,304 to Mimura et al. describes a building integrated photovoltaic roof in which an upper-end engaging portion of a downstream roof panel is seam jointed with a lower-end engaging portion of an upstream roof panel, wherein at least the lower-end engaging portion has flexural rigidity enough to disengage the seam joint.

U.S. Pat. No. 6,269,596 to Ohtsuka et al. teaches a building integrated photovoltaic roof member and mounting method thereof wherein roof members are those fixed to the roof, each roof member being a combination solar cell and roof member having a solar cell element and a metal reinforcing member, wherein a metal member is provided below the combination solar cell and roof member or a metal member is provided along an adjacent portion between adjacent combination solar cell and roof members, wherein the metal member is electrically conductive to metal reinforcing members of plural combination solar cell and roof members and wherein the metal member is electrically grounded. Provided based on this structure are the roof members easy to install and excellent in the external view and electric safety.

U.S. Pat. No. 6,242,685 to Mizukami et al. discloses a structure and method of installing photovoltaic modules wherein a photovoltaic module has a cathode and anode acting as electrodes for collecting an output power. When the photovoltaic module is installed on a roof of a building for example, the cathode is located at a position higher than the anode.

U.S. Pat. No. 4,636,577 to Peterpaul describes a building integrated photovoltaic module for directly mounting to a roof surface comprising a plurality of solar panels and a low profile, elongated frame including a generally flat, rectangular base having a plurality of substantially planar surfaces for supporting the under surfaces of the solar panels. The panels are removably sealed to the frames at the under surfaces thereof, rendering the upper surfaces fully free and unencumbered for receipt of incident solar radiation. The frame includes, integrally therewith, upstanding walls adjacent opposite edges of the panel supporting surfaces, defining raceway channels for concealed passage of electrical wires connected to the solar panels. The channels and walls have provision for overlapping interlocking with similarly fabricated frames for ease of installation, weather-proofing and high-density panel mounting.

U.S. Pat. No. 4,392,009 to Napoli teaches a solar power module comprising an array of solar cells arranged on a flat panel, the panel being supported by a substantially rigid, easily assembled frame comprising spaced apart side channels that each interlock with adjacent end channels to form a single photovoltaic module.

U.S. Pat. No. 4,336,413 to Tourneux discloses a building integrated photovoltaic generating panel easily adaptable to a roof. The panel is equipped with a peripheral frame formed by the assembly of straight light alloy shapes. The particular form of these shapes makes possible the laying of adjacent panels with overlapping of the edges of the latter similar to roof tiles.

U.S. Pat. No. 4,246,892 to Waiche describes a solar thermal energy collector panel, having an absorber plate and a frame within which the absorber plate is mounted. The absorber plate is comprised of a plurality of absorber plate sections each having interlocking structure formed along both of their lateral edges. This interlocking structure forms a tubular passage when the interlocking structure of the adjacent absorber plate sections are matingly locked together. An elongated tubing member whose external diameter is slightly larger than the internal diameter of the tubular passage is frictionally captured within each of the tubular passages. The absorber plate sections are formed of extruded metal and they have a plurality of corrugated surface portions that provide the absorber plate sections with greater surface exposure and improved absorption angles to the sun throughout the day. The thickness of the absorber plate sections is the greatest where the interlocking structure of the adjacent absorber plate sections are matingly locked together, thereby providing a greater mass for heat conduction transfer from the absorber plate sections to the elongated tubing member. The interlocking structure formed on the lateral edges of the absorber plate sections comprise a fin portion whose configuration is basically that of a cylindrical tube that has been cut in half longitudinally. A recess is formed adjacent one edge of the fin portion and a protrusion is formed adjacent the opposite edge of the fin portion. The frame has a back plate, side frame members, end frame members, and a glass top panel.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

Furthermore, it is clear from the lack of prior art and number of problems which still remain unaddressed, that a definite need exists for a simple, cost-effective widely adaptable PV module mounting system which is integrated into the PV module frame design and which provides improved alignment capability, simplified and more reliable grounding, wiring which is hidden from view yet always accessible without removing a PV module, ability to always connect to the rafters, minimization of required penetrations in the roof, greater ease of installation, backward compatibility with inward facing flange framing systems, ability to connect PV module frame directly on top of a roof or mounting structure without the need for costly struts and hardware or expensive building integrated PV technologies, ability to remove any PV module in the array without having to remove others or pull out primary penetrating bolts, ability to easily add and remove optional items like debris screens and cosmetic flashings and caps, and improved appearance.

BRIEF SUMMARY OF THE INVENTION

The method and apparatus for mounting photovoltaic modules of this invention provides a simple, cost-effective, complete mounting strategy for installing photovoltaic modules on most common roofs, structures, vehicles, and surfaces. The present invention provides an interlocking photovoltaic module mounting system that provides a one piece, integrated photovoltaic module frame portion that is directly mountable to a support structure and interlocks with separate adjoining photovoltaic module frame portions. The inventive apparatus includes a frame member for enclosing the perimeter of a photovoltaic laminate and which is made of substantially similar construction on all four sides; the frame member having a top portion, bottom portion, inside surface, and outside surface, the inside surface including a recess for capture of the laminate. The frame member outside surface includes at least one interlocking means for adjoining a first frame member of a first PV module with a second frame member on an adjacent, second PV module to form a planar array.

A preferred embodiment of the invention includes an interlocking mechanism comprising at least one C-shaped channel portion on the outside surface of the PV module frame member with the opening oriented parallel to the plane of the substantially flat top solar cell covering, and which interlocks with an identical adjoining C-shaped channel portion of an adjoining PV module frame member through the use of a separate male coupling member which is inserted into the C-shaped portions of the two adjoining modules. The adjacent C-shaped channel portions do not overlap each other. The male coupling member may also serve as a means for providing electric ground continuity between PV modules.

The frame member bottom portion may also include at least one height-adjustable mounting foot portion which is also adjustable in a direction perpendicular to the primary structural elements which are supporting the PV array, such as the rafters of a roof, and which provides a means for attaching the frame member to a structural member, and at least one height adjustable leveling foot portion which provides a means for supporting the frame member and adjustably, vertically aligning individual PV modules with adjoining PV modules to form a substantially planar PV array.

The inventive system thus provides an interlocking, self-grounding, and self-aligning framing structure for each module, which provides three-dimensional adjustability, allows simple connection to the rafters, minimizes penetrations in the roof, allows access to wiring interconnects without removing modules, does not require expensive strut hardware, utilizes a non-overlapping, interlocking mechanism which allows for all PV modules in an array to rest in the same plane instead of having consecutive modules at slightly different angles due to the overlapping nature of an interleaved connection, and which in some embodiments allows removal of single PV modules from the middle of the array.

The inventive system also provides an attractive appearance by having a low profile, with no gaps between modules, and no visible hold-downs or hardware, plus optional cosmetic flashings for screening visible edges of the array and optional cosmetic caps for covering the small gaps that may occur, or in one embodiment, for bridging between two adjacent PV modules to cover the wiring. Additional benefits are further described herein.

It is therefore an object of the present invention to provide a new and improved frame apparatus for photovoltaic modules.

It is another object of the present invention to provide a new and improved interlocking photovoltaic module mounting system.

A further object or feature of the present invention is a new and improved interlocking, self-grounding, and self-aligning framing structure for photovoltaic modules.

An even further object of the present invention is to provide a novel method for mounting photovoltaic modules.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS/FIGURES

The invention will be better understood and objects other than those set forth above will become apparent when consideration is given to the following detailed description thereof. Such description makes reference to the annexed drawings wherein:

FIG. 7 is an enlarged perspective view of two adjacent interlocked photovoltaic module frames illustrating the interlocking mechanism.

DETAILED DESCRIPTION OF THE INVENTION

Figure 1:
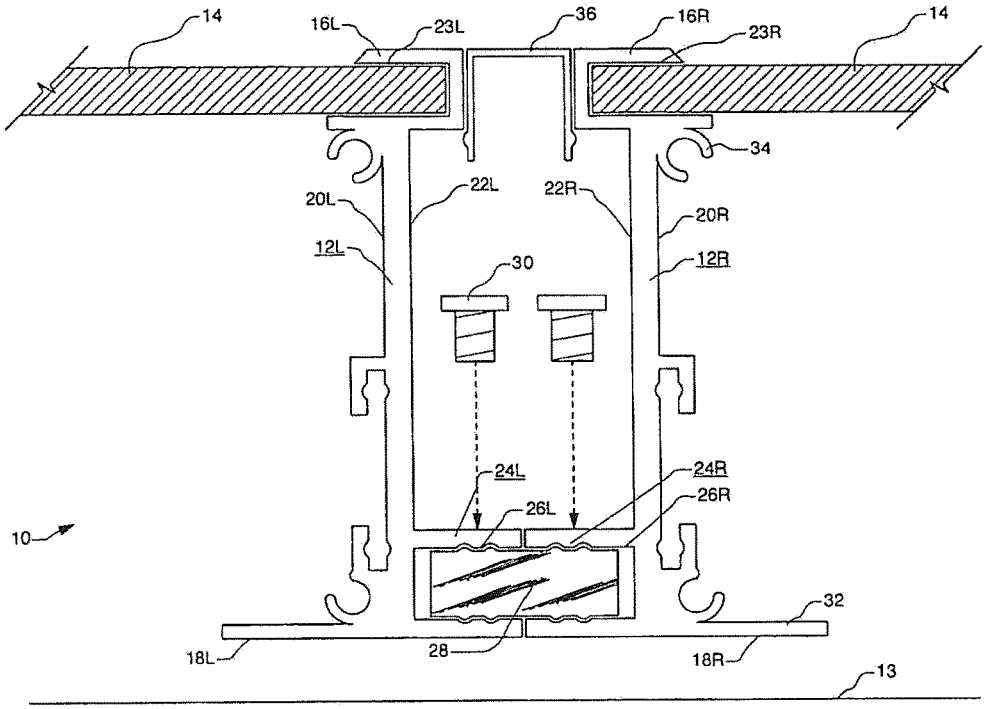
FIG. 1 is a side elevation cross-sectional view of a first embodiment of an interlocking photovoltaic module mounting system of this invention, illustrating two adjacent interlocked photovoltaic module frames.

Referring to FIGS. 1 through 7, wherein like reference numerals refer to like components in the various views, there is illustrated therein a new and improved apparatus for mounting photovoltaic modules to a roof, generally denominated 10 herein.

FIG. 1 is a side elevation cross-sectional view of a first embodiment of an interlocking photovoltaic module mounting system 10 of this invention, illustrating two adjacent interlocked photovoltaic module frames 12L, 12R above a roof 13. Each frame member encloses the perimeter of a photovoltaic laminate 14. Each frame is made of substantially similar construction on all four sides, and each includes a top portion 16L, 16R, bottom portion 18L, 18R, inside surface 20L, 20R, and outside surface 22L, 22R. Inside surfaces 20L, 20R include a recess 23L, 23R for capture of the laminate 14. The frame member outside surfaces 22L, 22R include at least one interlocking mechanism 24L, 24R for adjoining frame 12L to adjacent frame 12R to form a planar array of laminates 14.

Interlocking mechanism 24L, 24R may consist of C-shaped or female channel portions 26L, 26R on the outside surfaces 22L, 22R of each of the PV module frame members with the opening oriented parallel to the plane of the substantially flat top solar cell 14, through the use of a separate male coupling member 28 which is inserted into the C-shaped portions of the two adjoining modules. Thus, the male coupling portion (coupling member 28) positions the first and second frame members above a support structure (see frames 12L, 12R above roof 13 in FIG. 1, and further shown in the embodiments of FIGS. 2-5) without clamping the first and second frame members to the support structure located beneath the first frame member; and a discrete male coupling portion (coupling member 28) acts to position a first frame member above a support structure (roof 13) with an unfilled open area, space, gap, or clearance between at least a first frame member and the support structure. The male coupling member 28 may also serve as a means for providing electric ground continuity between PV modules, as by tapping the coupling member 28 with the optional grounding screws 30.

The frame members may be constructed as an extrusion, with all portions run full length except the top of the female channel portion at the ends, and various slots and holes which may be punched out after the extrusion is run. The frame members may include an inward flange 32 for backward compatibility with existing mounting systems. Screw holes 34 may be used to connect frame pieces together at the module corners.

The frames may include an optional cosmetic cap 36 for covering the small gaps that may occur, or in one embodiment, for bridging between two adjacent PV modules to create a wireway.

Figure 2:
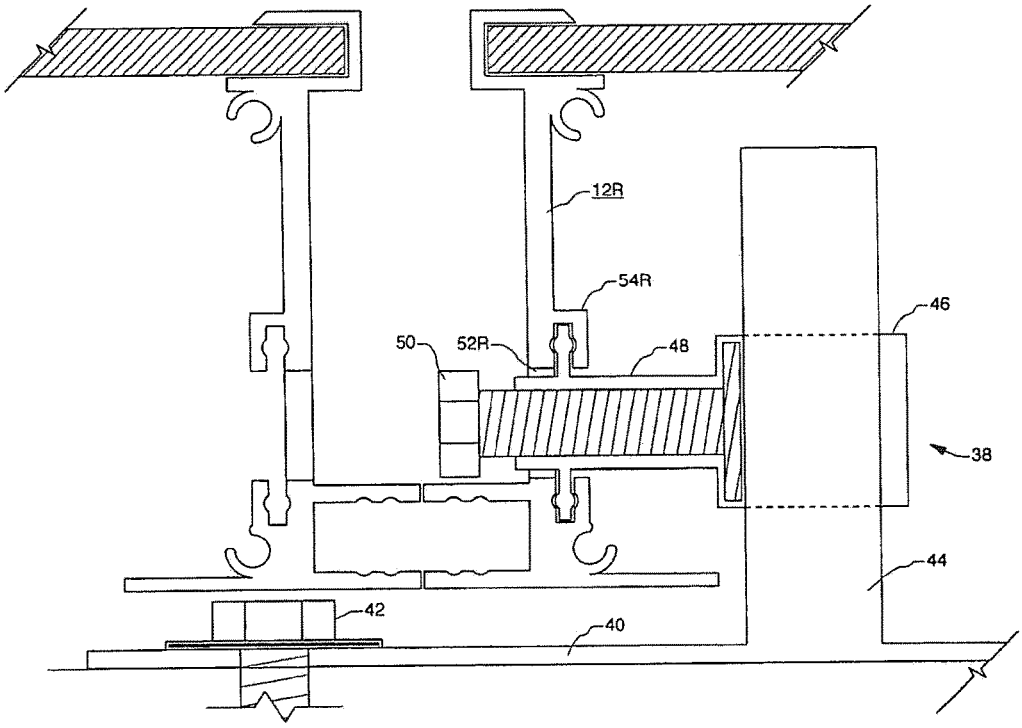
FIG. 2 is a side elevation cross-sectional view of the interlocking photovoltaic module frames of FIG. 1, this section take at a mounting foot.

FIG. 2 is a side elevation cross-sectional view of the interlocking photovoltaic module frames 12L, 12R, this section illustrating a mounting foot 38. Mounting foot 38 includes lateral portion 40 which may be secured to a roof with lag bolt 42, and vertical (cylindrical) portion 44, which is captured by foot sleeve 46 of mounting foot bracket 48. Bolt 50, with a bolt head shown between frames 12L, 12R, threads into bracket 48 and compresses against the vertical portion 44 of the mounting foot 38 to secure the mounting foot in position and at the desired height. Mounting foot bracket 48 is preferably inserted through slot 52R of frame 12R, and secured there by twist lock clip 54R. With this arrangement the bracket portion is both angularly (as by rotation of sleeve 46 around cylindrical vertical portion 44 or vice versa) and vertically adjustable about and along a substantially vertical axis (an axis through a vertically oriented centerline of vertical portion 44). The presence of bolt head for bolt 50 in the gap between frame 12L, 12R results in the threaded height adjustment mechanism being operable from a position substantially above said female receiving portions 26L, 26R of frames 12L, 12R. Also, a frame member is shown in FIG. 2 as being located immediately above and clearing a support structure (roof 13) as there is an unfilled open area, space, gap, or clearance below a frame member and above the roof 13; as well as shown with embodiments in FIGS. 1, and 3-5.

Figure 3:
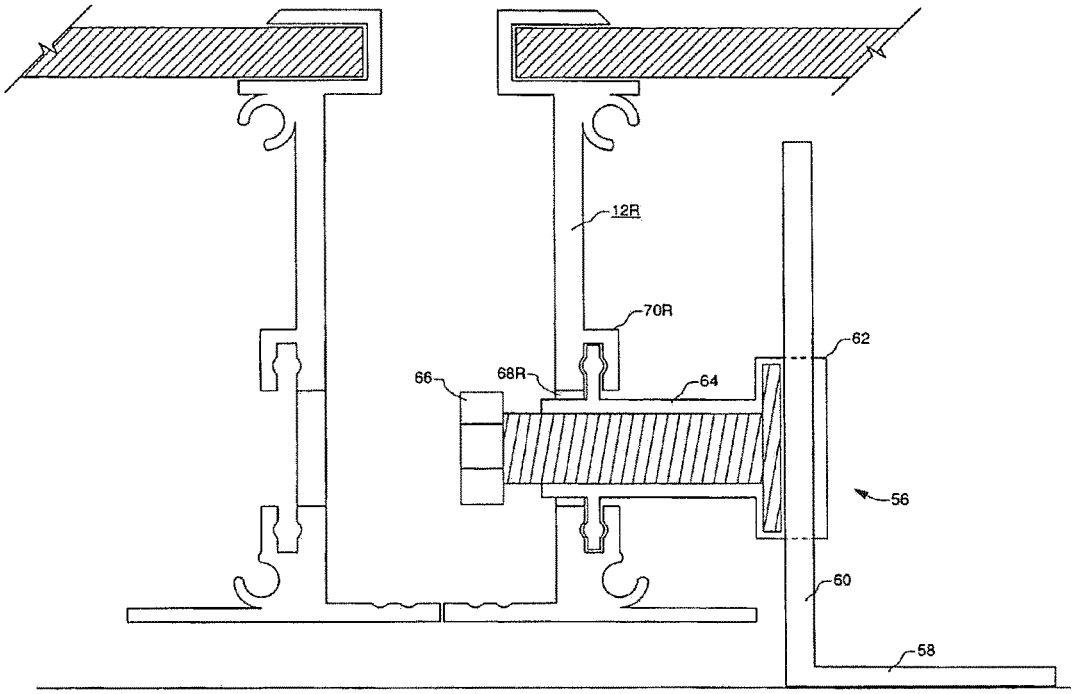
FIG. 3 is a side elevation cross-sectional view of the interlocking photovoltaic module frames of FIG. 1, this section take at a leveling foot.

FIG. 3 is a side elevation cross-sectional view of the interlocking photovoltaic module frames 12L, 12R, this section illustrating a leveling foot 56. Leveling foot 56 includes lateral portion 58 (which is preferably not physically secured to the roof), and vertical portion 60, which is captured by foot sleeve 62 of leveling foot bracket 64. Bolt 66 threads into bracket 64 and compresses against the vertical portion 60 of the leveling foot 56 to secure the leveling foot in position at the desired height. Leveling foot bracket 64 is preferably inserted through slot 68R of frame 12R, and secured there by twist lock clip 70R.

Figure 4:
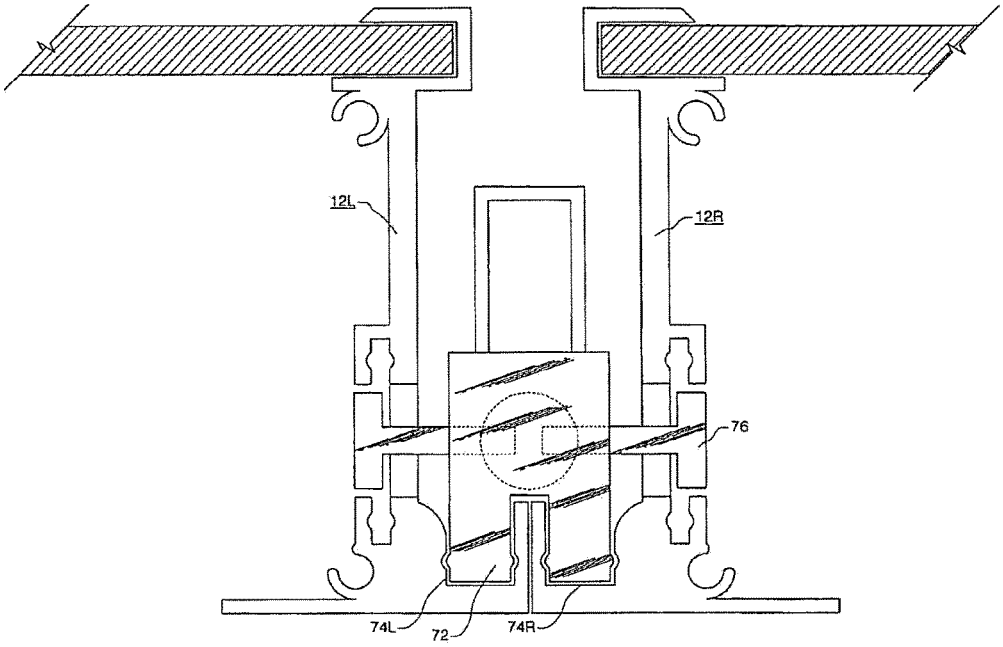
FIG. 4 is a side elevation cross-sectional view of an alternate embodiment of an interlocking mechanism for photovoltaic module frames of this invention.

FIG. 4 is a side elevation cross-sectional view of an alternate embodiment of an interlocking mechanism for photovoltaic module frames of this invention. Here, U-clip coupling strip 72 engages vertically-oriented channels 74L, 74R to secure the adjacent modules together. Spring loaded pins 76 extend into the frames 12L, 12R, and may be released by pulling a handle at the top. A hook on the end of the coupling strip allows removal of the strip from an access port. Thus, in this embodiment a first male portion (the lower left portion of coupling strip 72) is shown inserted into and mating with an inside portion of the first frame member female receiving portion (channel 74L) and a second male portion (the lower right portion of coupling strip 72) is shown inserted into and mating with an inside portion of the second frame member female receiving portion (channel 74R) to securely interlock the first and second frame members together. Additionally, at least one of the self-locking male coupling portion(s) automatically locks into its respective female receiving portion similar to the embodiments shown in FIGS. 1 and 7 for horizontally oriented or C-shaped channels 26L, 26R being engaged by the left and right sides of separate male coupling member 28. Due to the configuration and shapes of the channel(s) (74L, 26L and 74R, 26R) and respective male portion(s) (left side of 72 or 28 and right side of 72 or 28), the respective male portions are self-locking and thus the male portion(s) automatically locks into its respective female receiving portion. Described differently, the self-locking male coupling portion (portions of 72 or 28) comprises one or more positive engagement feature(s) that mate with a female feature(s) on an inside surface of the fame member female receiving portion(s). Thus, a first self-locking male portion (left side of 72 or 28) may lock into a first respective female receiving portion (74L or 26L), and a second self-locking male portion (right side of 72 or 28) may lock into a second respective female receiving portion (74L or 26L). In the embodiments of FIGS. 1, 4, 6, and 7, a self-locking male coupling portion is shown connected to a first and a second frame member without the use of a separate fastener. Additionally, with regards to FIGS. 1 and 4, the male coupling portion (coupling member 28 and coupling strip 72) positions the first and second frame members above a support structure (roof 13), and the self-locking male coupling portion aligns the first and second frame members above the support structure with an unfilled open area, space, gap, or clearance between the first frame member and the support structure in an area beneath the male coupling portion.

Figure 5:
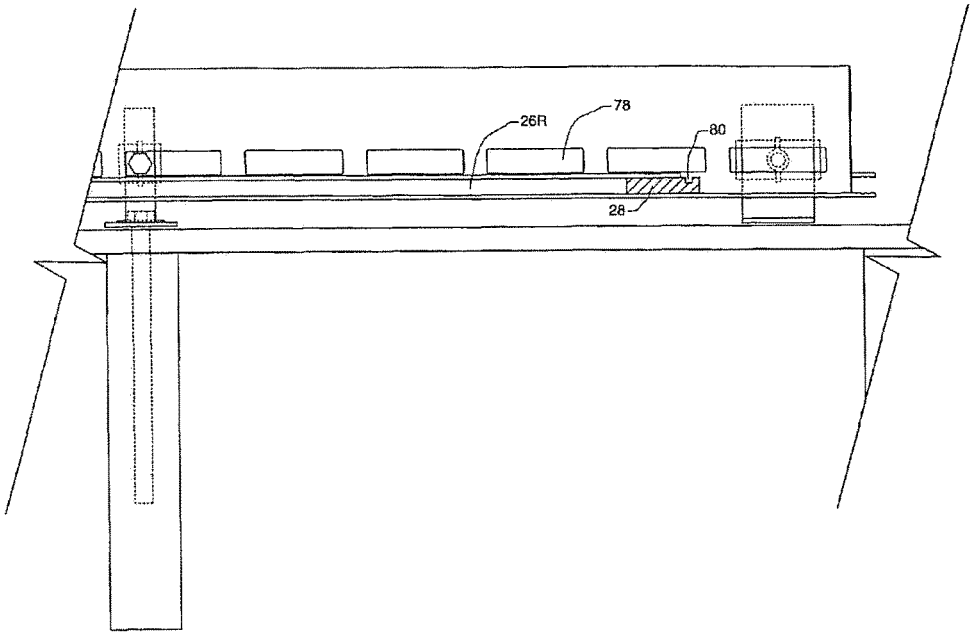
FIG. 5 is an end elevation view of a single photovoltaic module frame as installed on a roof.

FIG. 5 is an end elevation view of a single photovoltaic module frame as installed on a roof. This view illustrates the plurality of slots 78 available for mounting and leveling foot brackets, as well as for inter-module wiring access. This view also illustrates a slot 80 on coupling strip 28 which may be engaged by a screwdriver or other tool to move the strip into or out of engagement with the female channel portion 26R.

Figure 6:
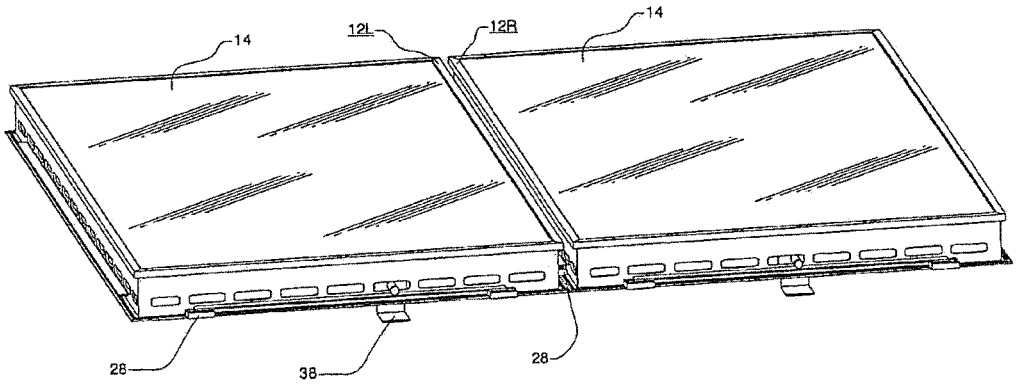
FIG. 6 is a perspective view of two adjacent interlocked photovoltaic module frames.

FIG. 6 is a perspective view of two adjacent interlocked photovoltaic module frames. This view serves to illustrate the coplanar nature of the laminates 14 in adjoining frames 12L and 12R to form a planar array of laminates. As shown in FIGS. 5, 6, and 7, a coupling portion (coupling member 28) may be located a laterally variable distance from a nearest connection point to a support structure. The lateral distance may vary as mounting foot 38 may support frames 12L, 12R at various lateral locations along frames 12L, 12R, or coupling member 28 may be located in various positions along frames 12L, 12R. Additionally, as shown in FIG. 5, male coupling portion (coupling member 28) positions a first frame member above a support structure with a clearance, gap, open area, or space between the first frame member and the support structure.

FIG. 7 is an enlarged perspective view illustrating interlocking mechanism 24L, 24R adjoining frame 12L to adjacent frame 12R. The interlocking mechanism may be a removable coupler such as a double male interlock, as illustrated, or may consist of any other releasable interlock that permits connection of adjacent frames on all four sides of a module such that the supported laminates are coplanar.

Inventive features of the present apparatus include, but are not limited to, the following:

Self-locking—module frames securely interlock together to form a completely connected array structure. In the preferred embodiment of the invention this interlocking is achieved by a female channel integrated into all four sides of the photovoltaic module frame which mates with a removable male coupling strip. The coupling strip is releasable from the top via a break in the extrusion thereby allowing removal of any single module without requiring removal of previous modules in the row, unlike previous attempts at interlocking functionality which used an overlapping technique instead of the coupling technique described herein. Another embodiment of the invention achieves release of the coupling strip from the top by utilizing spring loaded pins and a release handle.

Self-grounding—interlocking mechanisms provide a solid "electrical contact" (as required by the NEC) which is protected from the weather so it will last. One simple ground wire to one module grounds the whole array and its support structure. Another embodiment includes provision for a ground screw to tap the coupling strips if required for certain jurisdictions.

Self-aligning—as modules are snapped into place, they are automatically aligned on the side where the interlock is being made. Small leveling legs are provided on the opposing side of each module to fine tune the vertical alignment before securing it to the roof or structure. Straight, substantially planar arrays are simple even on dramatically swooping roofs.

Accessible yet hidden wiring—as each module goes down, the quick-connect electrical connectors are plugged together then tucked into a slot which is accessible from the top—allowing future repair of each module interconnection without removing any modules (note: installers can carefully crawl out on top of the modules to fix wiring on a module out in the middle). Thus, all wiring is still accessible, yet carefully hidden from view. Another embodiment includes a snap-on cover which hides the wiring.

Strutless design—while a separate optional piece can be added to allow connection to all standard struts on the market, the inventive apparatus is capable of mounting photovoltaic modules to most roof surfaces and structures without the need for expensive and time consuming strut at all.

Minimizes penetrations—while all other direct mount, strutless mounting systems require more penetrations than a strut mount, the inventive apparatus distributes the load more evenly across the array area and typically requires less penetrations. This unlikely result is obtained by reallocating two critical mounting hardware functions: 1) resisting the downward pull of gravity, and 2) resisting the upward pull of wind. All other mounting systems combine these two functions into a single portion, most commonly a foot-type portion. A preferred embodiment of the inventive apparatus however separates these two functions into two different types of feet: leveling feet which are not fastened to the roof or structure and primarily resist gravity, and carefully spaced mounting feet which are fastened to the roof and primarily resist windloads.

Works on most roof types—The inventive apparatus is compatible with all common roofs and surfaces found including: composition shingle, tile, shake, tar & gravel, membrane, standing seam, trellis or other wooden structure, ground mount metal structure, and many others. A preferred embodiment includes the use of circular foot members which allow standard circular pipe flashings to be used.

Flexible orientation—The inventive apparatus works with Landscape and Portrait orientations and photovoltaic module rows can be installed in any order. However, the inventive apparatus does favor Landscape orientation which allows for fewer penetrations and, in most cases on sloped roofs, will yield a slightly higher kW/s.f. of roof area. Strut mounts, on the other hand, tend to favor portrait orientation which frequently results in less modules for the same roof. This happens because most roofs are wider east to west than they are tall (from ridge to gutter), so orienting the long dimension of the photovoltaic module parallel with the long dimension of the roof surface increases the likelihood of a better fit.

Rafter connection—unlike any other mounting system available, the inventive apparatus includes simple integral adjustability in X, Y, and Z so connection to rafters is always possible. Set one dimension, then quickly adjust the other two with a single, easily accessible bolt. Fumbling with nuts, washers, and lock washers or losing hardware as it rolls down the roof, as is typically the case when mounting PV modules, is not required since a single wrench operates all integral bolts.

Adjustable height—a preferred embodiment allows module height off of the roof or structure to be fully adjustable (no discrete holes) from 0" to approximately 2.5" (depending on module frame depth) so that the correct height for each situation can be chosen depending on the water damming, aesthetic, and debris issues on site.

No gaps—Interlocking frames eliminate all gaps between modules and wire access ports are not discernible from the ground because there is a black frame right behind them.

Easier obstacle avoidance—unlike strut systems which require ending the strut and starting a new row every time you run across a roof vent or skylight, the inventive apparatus easily accommodates small obstructions by simply leaving out a module.

Snap-on options—Cosmetic flashings can be snapped right into the frames along visible sides of the array to eliminate problematic viewing angles beneath the modules, or in heavily treed areas, debris screens can be snapped on forming a complete skirt around the array. Other embodiments include snap-on pre-stressed sheet metal pieces to receive conduit, snap-on junction boxes and wiring combiner boxes, and snap-on caps between PV modules to cover wiring.

Backward compatible—The inventive apparatus can be manufactured in a way which is completely backward compatible with all standard photovoltaic frames and mounting techniques. Almost all photovoltaic modules come with a C-shaped frame that includes mounting holes on an inward facing bottom flange. In addition to all of its other features, the inventive apparatus can include the exact same holes in the same relative place.

Low Cost—Unlike other attempts to integrate more features into the PV module frame, the inventive apparatus includes frame members which are extruded from the exact same die, thereby minimizing manufacturing tooling costs. Low part count and simple installation also save PV contractor time & money.

Removing single modules—A preferred embodiment includes coupling members which are removable from the top thereby allowing removal of single PV modules no matter what location in the PV array (and without requiring the seals to be broken between module and the roof, if applicable).

Thus, the invention may be characterized as a photovoltaic module comprising a photovoltaic laminate having a perimeter; a frame member for enclosing the perimeter of the photovoltaic laminate, the frame member having a top portion, bottom portion, inside surface, and outside surface, the inside surface including a recess for capture of said laminate, and the outside surface including at least one interlocking means for connection to a frame member of an adjacent photovoltaic module so that the photovoltaic laminate is coplanar with the photovoltaic laminate of the adjacent photovoltaic module. In addition, the photovoltaic module frame member comprises individually disengageable interlocking mechanisms for the photovoltaic modules in a formed array.

Alternatively, the invention may be characterized as a method for mounting photovoltaic laminates to a roof comprising the steps of: enclosing the perimeter of each photovoltaic laminate in a frame member having a top portion, bottom portion, inside surface, and outside surface, the inside surface including a recess for capture of the photovoltaic laminate; and interlocking one frame member outside surface to the complementary outside surface of an adjacent frame member to form a planar array of photovoltaic laminates on the roof.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

~~1. A photovoltaic module array comprising:~~

~~a first frame member enclosing a single photovoltaic laminate, said first frame member having a plurality of side wall portions each having a top portion, bottom portion, inside surface, and outside surface, said inside surface including a recess for capture of said photovoltaic laminate, at least one of said side wall portions including at least one interlocking means comprising a female receiving portion integrated into said outside surface;~~

~~a second frame member enclosing a single photovoltaic laminate, said second frame member having a plurality of side wall portions each having a top portion, bottom portion, inside surface, and outside surface, said inside surface including a recess for capture of said photovoltaic laminate, at least one of said side wall portions including at least one interlocking means comprising a female receiving portion integrated into said outside surface; and~~

~~a discrete male coupling portion interlocking said first frame member female receiving portion and said second frame member female receiving portion, wherein said first frame member female receiving portion comprises an inside surface which positively engages an outside surface of said male coupling portion to resist a downward force on said second frame member.~~

~~2. The photovoltaic module array of claim 1 wherein said male coupling portion solely spans between immediately adjacent side wall portions in said photovoltaic module array.~~

3. A photovoltaic module array comprising:

a first frame member enclosing a single photovoltaic laminate, said first frame member having a plurality of side wall portions each having a top portion, bottom portion, inside surface, and outside surface, said inside surface including a recess for capture of said photovoltaic laminate, at least one of said side wall portions including at least one interlocking portion comprising a female receiving portion integrated into said outside surface;

a second frame member enclosing a single photovoltaic laminate, said second frame member having a plurality of side wall portions each having a top portion, bottom portion, inside surface, and outside surface, said inside surface including a recess for capture of said photovoltaic laminate, at least one of said side wall portions including at least one interlocking portion comprising a female receiving portion integrated into said outside surface;

a discrete male coupling portion interlocking said first frame member female receiving portion and said second frame member female receiving portion, such that said first frame member contributes to a resistance of a downward force exerted on said second frame member near said male coupling portion;

wherein said first and second frame member side wall portions' outside surfaces each face a direction substantially opposite respective inside surfaces and comprise a length substantially parallel with a skyward facing plane of said photovoltaic laminate, said female receiving portions run substantially the entire length of said respective side wall portions, and said male coupling portion has a length substantially less than a length of one of said female receiving portions, thereby enabling said male coupling portion to be located at substantially any position along said length of said female receiving portion;

wherein said first frame member female receiving portion comprises an inside surface which positively engages an outside surface of said male coupling portion to resist said downward force; and wherein said photovoltaic module array comprises a height-adjustable foot portion.

~~4. The photovoltaic module array of claim 3 wherein said first frame member side wall portion outside surface is immediately adjacent to said second frame member side wall portion outside surface, said first frame member side wall portion outside surface being substantially parallel with and substantially nonlinear relative to said second frame member side wall portion outside surface.~~

~~5. The photovoltaic module array of claim 1 wherein said male coupling portion further comprises means for providing electrical ground continuity between said first and second frame members.~~

~~6. The photovoltaic module array of claim 1 wherein saidfirst frame member includes a cap member for affixation between said first frame member and an adjacent frame member.~~

~~7. The photovoltaic module array of claim 1 wherein said male coupling portion comprises a double male connector.~~

~~8. The photovoltaic module array of claim 1 wherein said first frame member female receiving portion inside surface comprises at least two opposing surfaces, a first opposing surface resisting downward forces presented to said second frame member and a second opposing surface resisting upward forces presented to said second frame member.~~

~~9. A photovoltaic module array comprising:~~

~~(a) a plurality of photovoltaic modules; and~~

~~(b) a plurality of coupling members; wherein each photovoltaic module comprises an integral frame member enclosing a single photovoltaic laminate, said frame member having a plurality of side wall portions each having a top portion, bottom portion, inside surface,~~

~~and outside surface, said inside surface including a recess for capture of said photovoltaic laminate, at least one of said side wall portions including at least one interlocking means comprising a female receiving portion integrated into said outside surface, each coupling member interlocking a first photovoltaic module and second photovoltaic module and comprising at least two male portions, a first male portion being inserted into the frame member female receiving portion of a first photovoltaic module, and a second male portion being inserted into the frame member female receiving portion of a second photovoltaic module, wherein said first photovoltaic module frame member female receiving portion comprises an inside surface which positively engages an outside surface of said male coupling portion to resist a downward force on said second photovoltaic module frame member.~~

~~10. The photovoltaic module array of claim 9 wherein said coupling members solely span between side wall portions of immediately adjacent photovoltaic modules in said photovoltaic module array, each side wall portion comprising inside and outside surfaces facing substantially opposite directions, each outside surface comprising a length running along a perimeter of said photovoltaic laminate, said female receiving portion running substantially the whole length of said side wall portion, adjacent side wall portions of said immediately adjacent photovoltaic modules comprising outside surfaces which are substantially parallel with and substantially non-linear relative to each other.~~

~~11. The photovoltaic module array of claim 9 wherein said photovoltaic modules are individually deployable.~~

~~12. The photovoltaic module array of claim 9 wherein said first frame member includes at least one height adjustable foot portion for supporting said first frame member.~~

~~13. The photovoltaic module array of claim 9 wherein said first frame member female receiving portion inside surface comprises at least two opposing surfaces, a first opposing surface resisting downward forces presented to said second frame member and a second opposing surface resisting upward forces presented to said second frame member.~~

~~14. The photovoltaic module array of claim 9 wherein said coupling member further comprises means for providing electrical ground continuity between said first and second photovoltaic modules.~~

~~15. A method for mounting photovoltaic modules to a roof structure, said method comprising the steps of:~~

~~providing a first frame member enclosing a single photovoltaic laminate, the first frame member having a plurality of side wall portions each having a top portion, bottom portion, inside surface, and outside surface, the inside surface including a recess for capture of the photovoltaic laminate, and at least one of the side wall portions including at least one interlocking means comprising a female receiving portion integrated into the outside surface;~~

~~providing a second frame member enclosing a single photovoltaic laminate, the second frame member having a plurality of side wall portions each having a top portion, bottom portion, inside surface, and outside surface, the inside surface including a recess for capture of the photovoltaic laminate, and at least one of the side wall portions including at least one interlocking means comprising a female receiving portion integrated into the outside surface; and~~

~~inserting a discrete male coupling portion into the first frame member female receiving portion and the second frame member female receiving portion to interlock the first frame member and the second frame member in an array above the structure, wherein the first frame member female receiving portion comprises an inside surface which positively engages an outside surface of the male coupling portion to resist a downward force on the second frame member.~~

~~16. The method for mounting photovoltaic modules to a structure of claim 15 further including the step of leveling the array on the structure with a height adjustable foot portion.~~

~~17. The method for mounting photovoltaic modules to a structure of claim 16 further including the step of securing the foot portion to the structure with a fastener.~~

~~18. The method for mounting photovoltaic modules to a structure of claim 16 further including the step of laterally adjusting the foot portion within the frame to align with a structural member.~~

~~19. A photovoltaic module array comprising:~~

~~a first frame member enclosing a single photovoltaic laminate, said first frame member having a plurality of side wall portions each having a top portion, bottom portion, inside surface, and outside surface, said inside surface including a recess for capture of said photovoltaic laminate, at least one of said side wall portions including at least one interlocking means comprising a female receiving portion integrated into said outside surface, wherein said female receiving portion only opens substantially perpendicularly relative to said side wall portion;~~

~~a second frame member enclosing a single photovoltaic laminate, said second frame member having a plurality of side wall portions each having a top portion, bottom portion, inside surface, and outside surface, said inside surface including a recess for capture of said photovoltaic laminate, at least one of said side wall portions including at least one interlocking means comprising a female receiving portion integrated into said outside surface, wherein said female receiving portion only opens substantially perpendicularly relative to said side wall portion; and~~

~~a discrete male coupling portion interlocking said first frame member female receiving portion and said second frame member female receiving portion, wherein said male coupling portion solely spans between immediately adjacent side wall portions in said photovoltaic module array.~~

20. A photovoltaic module array comprising:

a first photovoltaic module comprising a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, at least one of said side wall portions comprising a female receiving portion [integrated into] *in* said outside surface, wherein said female receiving portion [only] opens substantially [perpendicularly] *perpendicular* relative to said side wall portion;

a second photovoltaic module comprising a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, at least one of said side wall portions comprising a female receiving portion [integrated into] *in* said outside surface, wherein said female receiving portion [only] opens substantially [perpendicularly] *perpendicular* relative to said side wall portion;

a discrete male coupling portion interlocking said first frame member female receiving portion and said second frame member female receiving portion to form an elevated and connected array structure on top of a roofing surface, said first and second photovoltaic modules located immediately above and off of said roofing surface, said roofing surface forming part of a weather-tight skin of a building, extending from at least a ridge of said roof beneath said first frame member to a gutter of said roof, and comprising at least one of a shingle, a tile, and a shake;

an attachment portion penetrating through said roofing surface to attach said first frame member to said building, wherein said attachment portion comprises a height adjustable foot;

wherein said male coupling portion solely spans between immediately adjacent side wall portions in said photovoltaic module array; and wherein said first and second frame member side wall portions' outside surfaces each face a direction substantially opposite respective inside surfaces and comprise a length substantially parallel with a skyward facing plane of said first frame member photovoltaic laminate, said female receiving portions run substantially the entire length of said respective side wall portions, and said male coupling portion has a length substantially less than a length of one of said female receiving portions, thereby enabling said male coupling portion to be located at substantially any position along said length of said female receiving portion.

~~21. The photovoltaic module array of claim 19 wherein said first frame member side wall portion outside surface is immediately adjacent to said second frame member side wall portion outside surface, said first frame member side wall portion outside surface being substantially parallel with and substantially nonlinear relative to said second frame member side wall portion outside surface.~~

~~22. The photovoltaic module array of claim 19 wherein said male coupling portion further comprises means for providing electrical ground continuity between said first and second frame members.~~

~~23. The photovoltaic module array of claim 19 wherein said male coupling portion comprises a double male connector.~~

24. A photovoltaic module array comprising:

a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, at least one of said side wall portions comprising a female receiving portion having an interlocking function integrated into said outside surface;

a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, at least one of said side wall portions comprising a female receiving portion having an interlocking function integrated into said outside surface;

a discrete male coupling portion interlocking said first frame member female receiving portion and said second frame member female receiving portion, an installed position of said male coupling portion movably located at a variable location along said first frame member female receiving portion to vary a distance from a closest connection point to a support structure, said closest connection point being (a) one of a plurality of connection points comprising all connection points where said frame members connect to said support structure, said connections to said support structure including penetrations through a roofing surface and (b) closer to said male coupling portion than all other connection points of said plurality of connection points;

wherein said first and second frame member side wall portions' outside surfaces each face a direction substantially opposite respective inside surfaces and comprise a length substantially parallel with a skyward facing plane of said photovoltaic laminate, and said male coupling portion has a length substantially less than a length of one of said female receiving portions; and wherein said first frame member female receiving portion comprises an inside surface which positively engages an outside surface of said male coupling portion to resist a downward force on said second frame member.

25. The photovoltaic module array of claim 24, wherein said female receiving portions run substantially the entire length of said side wall portions, and said male coupling portion may be located at substantially any position along the length of said frame member side wall portions.

26. The photovoltaic module array of claim 24, wherein said male coupling portion interlocks said first frame member female receiving portion and said second frame member female receiving portion to form an elevated and completely connected array structure on top of a roofing surface, said first frame member and photovoltaic laminate forming a first photovoltaic module, said second frame member and photovoltaic laminate forming a second photovoltaic module, said first and second photovoltaic modules located immediately above and off of said roofing surface, said roofing surface (a) forming part of a weather-tight skin of a building, (b) extending from at least a ridge of said roof beneath said first frame member to a gutter of said roof, and (c) comprising at least one of a shingle, a tile, and a shake; and wherein said photovoltaic module array further comprises an attachment portion penetrating through said roofing surface to attach said first frame member to said building.

27. The photovoltaic module array of claim 24, wherein said coupling portion is movable with said closest connection point connecting said first frame member to said support structure.

28. The photovoltaic module array of claim 24, wherein said photovoltaic modules and a third like photovoltaic module located in a separate row are coplanar.

29. The photovoltaic module array of to claim 24, wherein (a) said support structure is a rafter and (b) an entirety of said male coupling portion moves together as a unit and said connection of said frame member to said rafter remains fixed during lateral movement of said male coupling portion from said installed position to a second installed position, said second installed position substantially closer to said rafter than said first installed position.

30. A photovoltaic module array comprising:

a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface;

a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface; and a discrete male coupling portion interlocking said first frame member female receiving portion and said second frame member female receiving portion;

wherein said first and second frame member side wall portions' outside surfaces each face a direction substantially opposite respective inside surfaces and comprise a length substantially parallel with a skyward facing plane of said photovoltaic laminate, and said male coupling portion has a length substantially less than a length of one of said sidewall portions;

wherein said photovoltaic array is mounted to a roof in a strutless configuration and said first frame member female receiving portion comprises an inside surface which positively engages an outside surface of said male coupling portion to resist a downward force on said second frame member, said strutless configuration not having two or more struts running above a roofing surface of said roof and fully spanning across said first and second frame members.

31. The photovoltaic module array of claim 30, wherein said strutless configuration does not have several struts or channels spanning across said first and second frame members from a sidewall of said first photovoltaic module to a sidewall of said second photovoltaic module, said first photovoltaic module sidewall located on an opposite side of said first module than said first photovoltaic module female receiving portion, said second photovoltaic module sidewall located on an opposite side of said second photovoltaic module than said second photovoltaic module female receiving portion.

32. The photovoltaic module array of claim 24, wherein said first frame member and photovoltaic laminate form a first photovoltaic module and said connection point to said support structure further includes a mounting foot positioning said first photovoltaic module off of said roofing surface and attaching said first frame member to said support structure.

33. A photovoltaic module array comprising:

a first photovoltaic module comprising a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, at least one of said side wall portions comprising a female receiving portion having an interlocking function integrated into said outside surface;

a second photovoltaic module comprising a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, at least one of said side wall portions comprising a female receiving portion having an interlocking function integrated into said outside surface; and a discrete male coupling portion interlocking said first frame member female receiving portion and said second frame member female receiving portion;

wherein an installed location of said male coupling portion and a location of a connection point between said first frame member and a support structure are independently adjustable laterally relative to said first frame member, said support structure located beneath said first frame member and supporting said photovoltaic module array;

wherein said first and second frame member side wall portions' outside surfaces each face a direction substantially opposite respective inside surfaces and comprise a length substantially parallel with a skyward facing plane of said photovoltaic laminate, and said male coupling portion has a length substantially less than a length of one of said female receiving portions;

wherein said first photovoltaic module is located immediately above and off of said support structure and said first frame member female receiving portion comprises an inside surface which positively engages an outside surface of said male coupling portion to resist a downward force on said second frame member.

34. The photovoltaic module array of claim 32, wherein installed positions of said mounting foot and said male coupling portion are independently adjustable laterally relative to said first frame member.

35. The photovoltaic module array of claim 32, wherein said mounting foot comprises a height-adjustment mechanism.

36. A photovoltaic module array for retrofitting on top of a roof, comprising:

a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, a first frame member side wall portion of said side wall portions extending from a first corner to a second corner of said first frame member and comprising a female receiving portion having an interlocking function integrated into said outside surface;

a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, a second frame member side wall portion of said side wall portions comprising a female receiving portion having an interlocking function integrated into said outside surface;

two discrete male coupling portions interlocking said first frame member female receiving portion and said second frame member female receiving portion; and a plurality of mounting feet, said plurality of mounting feet comprising all mounting feet attaching said photovoltaic module array to said roof, each mounting foot of said plurality of mounting feet comprising a fastener penetrating a roofing surface of said roof and securing said mounting foot to a discrete structural member beneath and supporting said roofing surface, wherein said photovoltaic module array is retrofitted on top of said roof, only one mounting foot of said plurality of mounting feet is secured to said first frame member sidewall portion, and no mounting feet of said plurality of mounting feet are secured to said second frame member sidewall portion, thereby minimizing a number of penetrations through said roofing surface required to mount said frame members;

wherein said first and second frame member side wall portions' outside surfaces each face a direction substantially opposite respective inside surfaces and comprise a length substantially parallel with a skyward facing plane of said photovoltaic laminate, said female receiving portions run substantially the entire length of said respective side wall portions, and said male coupling portion has a length substantially less than a length of one of said female receiving portions, thereby enabling said male coupling portion to be located at substantially any position along said length of said female receiving portion;

wherein said first frame member female receiving portion comprises an inside surface which positively engages an outside surface of said male coupling portion to resist a downward force on said second frame member.

37. The photovoltaic module array of claim 36, wherein (a) said roofing surface forms a part of a weather-tight skin of a building and (b) said roofing surface, in a substantially similar form and prior to installation of said photovoltaic module array, previously formed a part of said weather-tight skin of said building.

38. The photovoltaic module array of claim 36, wherein said roofing surface comprises at least one of a shingle, a tile, and a shake.

39. The photovoltaic module array of claim 37, wherein said mounting feet are height adjustable.

40. The photovoltaic module array of claim 36, wherein said modules are coplanar.

41. The photovoltaic module array of claim 36, wherein said photovoltaic array is mounted to a roof in a strutless configuration.

42. The photovoltaic module array of claim 36, wherein said structural member is at least one of a rafter, joist, or purlin.

43. The photovoltaic module array of claim 36, wherein said mounting feet are individually deployable.

44. The photovoltaic module array of claim 36, wherein said first frame member and first photovoltaic laminate form a first photovoltaic module, said one mounting foot positioning said first photovoltaic module off of said roofing surface.

45. The photovoltaic module array of claim 36, wherein each of said two couplings and said mounting foot are laterally adjustably connected to separate and non-overlapping regions of said first frame member sidewall portion, said regions not over-lapping each other with respect to said length of said first frame member sidewall portion, said one mounting foot connected in a region of said first frame member sidewall portion substantially laterally displaced from said first and second corners of said first frame member.

46. A photovoltaic module array comprising:

a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion having an interlocking function integrated into said outside surface;

a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion having an interlocking function integrated into said outside surface;

a height-adjustable foot portion; and a self-locking male coupling portion comprising a first male portion inserted into and engagingly mating with an inside portion of said first frame member female receiving portion and a second male portion inserted into and engagingly mating with an inside portion of said second frame member female receiving portion to securely interlock said first and second frame members together, said first male portion comprising a positive engagement portion that securely locks into said female receiving portion;

wherein said first frame member and said self-locking male coupling portion elevate a portion of said second frame member off of said roofing surface such that said first and second photovoltaic (PV) laminates are substantially coplanar; said first and second frame member side wall portions' outside surfaces each face a direction substantially opposite respective inside surfaces and comprise a length substantially parallel with a skyward facing plane of said photovoltaic laminate, said female receiving portions run substantially the entire length of said side wall portions, and said self-locking male coupling portion has a length substantially less than a length of one of said frame member side wall portions.

47. The photovoltaic module array of claim 46, wherein said self-locking male coupling portion locks said first and second frame members when said self-locking male coupling portion is only partially inserted.

48. The photovoltaic module array of claim 46, wherein said first frame member and first photovoltaic laminate form a first photovoltaic module, said self-locking male coupling portion elevating said first photovoltaic module off of a roofing surface.

49. The photovoltaic module array of claim 46, wherein installed positions of said foot portion and said self-locking male coupling portion are independently adjustable laterally relative to said first frame member.

50. The photovoltaic module array of claim 46, wherein said photovoltaic array is mounted to a roof in a strutless configuration, said strutless configuration not having two or more struts fully spanning across said first and second frame members.

51. The photovoltaic module array of claim 46, wherein a first downward force exerted on said first frame member at a point directly above said self-locking male coupling portion causes said self-locking male coupling portion to exert a second downward force on said second frame member, said point and a midpoint of a length of said coupling are on a line perpendicular to said length of said coupling, said length of said coupling measured parallel with a length of said first frame member receiving portion and in a plane substantially parallel with said skyward facing plane of said first frame member photovoltaic laminate.

52. The photovoltaic module array of claim 46 further comprising at least one of a snap-on cosmetic flashing, a junction box, a wiring combiner box, and a screen snapped into said first frame member female receiving portion.

53. The photovoltaic module array of claim 46, wherein a second sidewall portion of said first frame member side wall portions comprises a female receiving portion interlocking with a second and a third self-locking male coupling portions, said second sidewall female receiving portion positioned orthogonal to said first frame member female receiving portion, said second and third self-locking male coupling portions adapted to laterally engage with a third frame member female receiving portion while interlocked to said first frame member female receiving portion.

54. A photovoltaic module array comprising: (a) a plurality of photovoltaic modules; and (b) a plurality of coupling members; wherein each photovoltaic module comprises an integral frame member enclosing a single photovoltaic laminate, said frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface, a first coupling member of said coupling members interlocking a first frame member of a first photovoltaic module of said plurality of photovoltaic modules and a second frame member of a second photovoltaic module of said plurality of photovoltaic modules and comprising at least two male portions, a first male portion being inserted into the frame member female receiving portion of said first photovoltaic module, and a second male portion being inserted into the frame member female receiving portion of said second photovoltaic module, such that said first frame member and said second frame member both resist a substantially downward force exerted on said second frame member near said male coupling portion; wherein said first frame member female receiving portion comprises an inside surface which positively engages an outside surface of said male coupling portion to resist said downward force on said second frame member.

55. The photovoltaic module array of claim 54, wherein said first frame member comprises a height-adjustable foot portion for supporting said first frame member, said height-adjustable foot portion comprising a threaded height adjustment mechanism, said threaded height adjustment mechanism being operable from a position substantially above said female receiving portions of said first and second frame members in said photovoltaic module array.

56. The photovoltaic module array of claim 55, wherein said height-adjustable foot portion is adapted to simultaneously adjust the height of said first and second frame members.

57. The photovoltaic module array of claim 55, wherein said threaded height adjustment mechanism comprises a bolt, said bolt comprising an engagement portion adapted to receive a tool, said engagement portion located substantially in a gap between said first and second frame members.

58. The photovoltaic module array of claim 55, wherein said threaded height adjustment mechanism comprises a bolt.

59. The photovoltaic module array of claim 55, wherein said threaded height adjustment mechanism comprises no more than one bolt for actuating height adjustments.

60. The photovoltaic module array of claim 54, wherein said plurality of photovoltaic modules are substantially coplanar, said photovoltaic module array further comprising a plurality of height-adjustable foot portions adapted for adjustment while said photovoltaic modules are interlocked together and to move said plurality of photovoltaic modules from a first plane to a second plane, said second plane being substantially parallel to said first plane.

61. The photovoltaic module array of claim 60, wherein said plurality of height-adjustable foot portions are accessible from above said photovoltaic module array.

62. The photovoltaic module array of claim 60, wherein a height-adjustable foot portion is accessible in a space between said first and second frame members.

63. The photovoltaic module array of claim 62, wherein said first frame member contributes an associated resistance to a resistance of said force provided by said second frame member.

64. The photovoltaic module array of claim 54, wherein said first frame member comprises a height-adjustable foot portion for supporting said first frame member, said height-adjustable foot portion comprises a lateral portion and a bracket portion, said lateral portion comprises a fastener for attachment to a support structure, and said bracket portion is connected to said first frame member and angularly and vertically adjustable about and along a substantially vertical axis.

65. The photovoltaic module array of claim 64, wherein said bracket portion is in twist-lock engagement with said first frame member.

66. The photovoltaic module array of claim 64, wherein rotation of said bracket portion secures it to said first frame member.

67. The photovoltaic module array of claim 64, wherein said height-adjustable foot portion further comprises a substantially cylindrical vertical height adjusting portion.

68. The photovoltaic module array of claim 64, wherein height of said bracket portion is adjustable while said photovoltaic module array is installed.

69. The photovoltaic module array of claim 54, wherein said first frame member comprises a height-adjustable foot portion for supporting said first frame member, said height-adjustable foot portion comprising a lateral portion and a bracket portion, said lateral portion comprising a fastener for attachment to a support structure, said bracket portion secured to said first frame member via rotation of said bracket portion.

70. The photovoltaic module array of claim 69, wherein said bracket portion is twistable into a final and secure position of engagement with said first frame member.

71. The photovoltaic module array of claim 54, wherein said photovoltaic module array further comprises a plurality of height-adjustable foot portions.

72. The photovoltaic module array of claim 69, wherein a height of said bracket portion is adjustable from the top while said first and second photovoltaic modules are installed.

73. The photovoltaic module array of claim 69, wherein said height-adjustable foot portion further comprises a substantially cylindrical vertical height adjusting portion.

74. The photovoltaic module array of claim 54, wherein said first frame member comprises a height-adjustable foot portion in twist lock engagement with said first frame member.

75. The photovoltaic module array of claim 74, wherein said height-adjustable foot portion is secured by twisting a portion of said foot portion.

76. The photovoltaic module array of claim 74 wherein a height of said bracket portion is adjustable from the top while said first and second photovoltaic modules are installed.

77. The photovoltaic module array of claim 54, wherein said first frame member includes a height-adjustable foot portion, said height adjustable foot portion comprising a height mechanism, said height mechanism actuating a change in height of said first and second photovoltaic module while said first coupling member is engaged with said first and second frame members.

78. The photovoltaic module array of claim 77, wherein said no more than one component is a threaded fastener.

79. The photovoltaic module array of claim 77, wherein said height mechanism is substantially continuously adjustable.

80. The photovoltaic module array of claim 77, wherein said no more than one component is accessible from a position above said photovoltaic array.

81. The photovoltaic module array of claim 77, wherein said no more than one component is adapted for engagement within a gap between said first and second photovoltaic modules.

82. The photovoltaic module array of claim 54, wherein said force is a force due to gravity.

83. The photovoltaic module array of claim 77, wherein said height-adjustable foot portion is self-locking to said female receiving portion.

84. A photovoltaic module array comprising:

a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface;

a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface; and a discrete male coupling portion interlocking said first frame member female receiving portion and said second frame member female receiving portion, such that (i) a downward load exerted on said second frame member near said male coupling portion is distributed through said coupling to said first frame member and (ii) an inside surface of said first frame member female receiving portion positively engages an outside surface of said male coupling portion to resist said downward load.

85. The photovoltaic module array of claim 84, wherein said photovoltaic module array further comprises a plurality of height-adjustable foot portions.

86. The photovoltaic module array of claim 84, wherein said downward load is a gravity load.

87. The photovoltaic module array of claim 84, wherein said downward load is distributed between said first and second frame members.

88. The photovoltaic module array of claim 84, wherein said photovoltaic module array is mounted on top of a sloped roof and a location of said second frame member is laterally displaced away from a location of said first frame member in a direction substantially perpendicular to a direction running from a gutter of said roof toward a ridge of said roof.

89. The photovoltaic module array of claim 20, wherein a first downward force exerted on said first frame member at a point directly above said male coupling portion causes said male coupling portion to exert a second downward force on said second frame member, said point and a midpoint of said length of said coupling are on a line perpendicular to a length of said coupling, said length of said coupling measured parallel with a length of said first frame member female receiving portion and in a plane substantially parallel with said skyward facing plane of said first frame member photovoltaic laminate.

90. A photovoltaic module array comprising:

a first frame member enclosing a single photovoltaic laminate, said first frame member having a plurality of side wall portions each having a top portion, bottom portion, inside surface, and outside surface, said inside surface including a recess for capture of said photovoltaic laminate, at least one of said side wall portions including at least one interlocking means comprising a female receiving portion integrated into said outside surface;

a second frame member enclosing a single photovoltaic laminate, said second frame member having a plurality of side wall portions each having a top portion, bottom portion, inside surface, and outside surface, said inside surface including a recess for capture of said photovoltaic laminate, at least one of said side wall portions including at least one interlocking means comprising a female receiving portion integrated into said outside surface; and a discrete male coupling portion interlocking said first frame member female receiving portion and said second frame member female receiving portion, wherein said first frame member female receiving portion comprises an inside surface which positively engages an outside surface of said male coupling portion to resist a downward force on said second frame member.

91. The photovoltaic module array of claim 90 wherein said male coupling portion solely spans between immediately adjacent side wall portions in said photovoltaic module array.

92. The photovoltaic module array of claim 90 wherein each of said first and second frame member side wall portions' outside surfaces each face a direction substantially opposite respective inside surfaces and comprise a length substantially parallel with a skyward facing plane of said photovoltaic laminate, said female receiving portions run substantially the entire length of said respective side wall portions, and said male coupling portion has a length substantially less than a length of one of said female receiving portions, thereby enabling said male coupling portion to be located at substantially any position along said length of said female receiving portions.

93. The photovoltaic module array of claim 92 wherein said first frame member side wall portion's outside surface is immediately adjacent to said second frame member side wall portion's outside surface, said first frame member side wall portion's outside surface being substantially parallel with and substantially nonlinear relative to said second frame member side wall portion's outside surface.

94. The photovoltaic module array of claim 90 wherein said male coupling portion further comprises means for providing electrical ground continuity between said first and second frame members.

95. The photovoltaic module array of claim 90 wherein said first frame member includes a cap member for affixation between said first frame member and an adjacent frame member.

96. The photovoltaic module array of claim 90 wherein said male coupling portion comprises a double male connector.

97. The photovoltaic module array of claim 90 wherein said first frame member female receiving portion inside surface comprises at least two opposing surfaces, a first opposing surface resisting downward forces presented to said second frame member and a second opposing surface resisting upward forces presented to said second frame member.

98. A photovoltaic module array comprising: (a) a plurality of photovoltaic modules; and (b) a plurality of coupling members; wherein each photovoltaic module comprises an integral frame member enclosing a single photovoltaic laminate, said frame member having a plurality of side wall portions each having a top portion, bottom portion, inside surface, and outside surface, said inside surface including a recess for capture of said photovoltaic laminate, at least one of said side wall portions including at least one interlocking portion comprising a female receiving portion integrated into said outside surface, each coupling member interlocking a first photovoltaic module and second photovoltaic module and comprising at least two male portions, a first male portion being inserted into the frame member female receiving portion of a first photovoltaic module, and a second male portion being inserted into the frame member female receiving portion of a second photovoltaic module, wherein said first photovoltaic module frame member female receiving portion comprises an inside surface which positively engages an outside surface of said male coupling portion to resist a downward force on said second photovoltaic module frame member.

99. The photovoltaic module array of claim 98 wherein said coupling members solely span between side wall portions of immediately adjacent photovoltaic modules in said photovoltaic module array, each side wall portion comprising inside and outside surfaces facing substantially opposite directions, each outside surface comprising a length running along a perimeter of said photovoltaic laminate, said female receiving portion running substantially the whole length of said side wall portions, adjacent side wall portions of said immediately adjacent photovoltaic modules comprising outside surfaces which are substantially parallel with and substantially nonlinear relative to each other.

100. The photovoltaic module array of claim 98 wherein said photovoltaic modules are individually deployable.

101. The photovoltaic module array of claim 98 wherein said first frame member includes at least one height-adjustable foot portion for supporting said first frame member.

102. The photovoltaic module array of claim 98 wherein said first frame member female receiving portion inside surface comprises at least two opposing surfaces, a first opposing surface resisting downward forces presented to said second frame member and a second opposing surface resisting upward forces presented to said second frame member.

103. The photovoltaic module array of claim 98 wherein said coupling member further comprises means for providing electrical ground continuity between said first and second photovoltaic modules.

104. A method for mounting photovoltaic modules to a roof structure, said method comprising the steps of:

providing a first frame member enclosing a single photovoltaic laminate, the first frame member having a plurality of side wall portions each having a top portion, bottom portion, inside surface, and outside surface, the inside surface including a recess for capture of the photovoltaic laminate, and at least one of the side wall portions including at least one interlocking portion comprising a female receiving portion integrated into the outside surface;

providing a second frame member enclosing a single photovoltaic laminate, the second frame member having a plurality of side wall portions each having a top portion, bottom portion, inside surface, and outside surface, the inside surface including a recess for capture of the photovoltaic laminate, and at least one of the side wall portions including at least one interlocking portion comprising a female receiving portion integrated into the outside surface; and inserting a discrete male coupling portion into the first frame member female receiving portion and the second frame member female receiving portion to interlock the first frame member and the second frame member in an array above the structure, wherein the first frame member female receiving portion comprises an inside surface which positively engages an outside surface of the male coupling portion to resist a downward force on the second frame member.

105. The method for mounting photovoltaic modules to a structure of claim 104 further including the step of leveling the array on the structure with a height-adjustable foot portion.

106. The method for mounting photovoltaic modules to a structure of claim 105 further including the step of securing the foot portion to the structure with a fastener.

107. The method for mounting photovoltaic modules to a structure of claim 105 further including the step of laterally adjusting the foot portion within the frame to align with a structural member.

108. A photovoltaic module array comprising:

a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion having an interlocking function integrated into said outside surface;

a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion having an interlocking function integrated into said outside surface; and a discrete male coupling portion interlocking said first frame member female receiving portion and said second frame member female receiving portion;

wherein said first and second frame member side wall portions' outside surfaces each face a direction substantially opposite respective inside surfaces and comprise a length substantially parallel with a skyward facing plane of said photovoltaic laminate, and said male coupling portion has a length substantially less than a length of one of said side wall portions;

wherein said photovoltaic array is mounted to a roof in a strutless configuration and said first frame member female receiving portion comprises an inside surface which positively engages an outside surface of said male coupling portion to resist a downward force on said second frame member.

109. The photovoltaic module array of claim 108 wherein said strutless configuration connects said array to a roof without a strut (i) located above said roof and (ii) spanning multiple photovoltaic modules.

110. A photovoltaic module array comprising:

a first frame member enclosing a single photovoltaic laminate, said first frame member having a plurality of side wall portions each having a top portion, bottom portion, inside surface, and outside surface, said inside surface including a recess for capture of said photovoltaic laminate, at least one of said side wall portions including at least one interlocking portion comprising a female receiving portion integrated into said outside surface;

a second frame member enclosing a single photovoltaic laminate, said second frame member having a plurality of side wall portions each having a top portion, bottom portion, inside surface, and outside surface, said inside surface including a recess for capture of said photovoltaic laminate, at least one of said side wall portions including at least one interlocking portion comprising a female receiving portion integrated into said outside surface; and a discrete male coupling portion interlocking said first frame member female receiving portion and said second frame member female receiving portion, wherein said first frame member female receiving portion comprises an inside surface which positively engages an outside surface of said male coupling portion to resist a downward force on said second frame member.

111. The photovoltaic module array of claim 110 wherein said photovoltaic module array comprises a height-adjustable foot portion.

112. The photovoltaic module array of claim 110 wherein said photovoltaic module array is mounted to a roof in a strutless configuration, said strutless configuration not having two or more struts fully spanning across said first and second frame members.

113. The photovoltaic module array of claim 110 wherein said photovoltaic module array further comprises a mounting foot connected to said first frame member and installed positions of said mounting foot and said male coupling portion are independently adjustable laterally relative to said first frame member.

114. The photovoltaic module array of claim 110 wherein said male coupling portion interlocks said first and second frame members such that said downward force exerted on said second frame member near said male coupling portion is distributed between said first and second frame members.

115. The photovoltaic module array of claim 110 wherein said male coupling portion interlocks said first and second frame members such that said first frame member non-negligibly contributes to a resistance of a downward force exerted on said second frame member near said male coupling portion.

116. The photovoltaic module array of claim 110 wherein said discrete male coupling portion interlocks said first frame member female receiving portion and said second frame member female receiving portion to form an elevated and completely connected array structure on top of a roofing surface, said first and second photovoltaic modules located immediately above and off of said roofing surface, said roofing surface forming part of a weather-tight skin of a building, extending from at least a ridge of said roof beneath said first frame member to a gutter of said roof, and comprising at least one of a shingle, a tile, and a shake; and wherein said photovoltaic module array further comprises an attachment portion penetrating through said roofing surface to attach said first frame member to said building.

117. The photovoltaic module array of claim 110 wherein said photovoltaic module array further comprises a first mounting foot adjustably connected to said first frame member and a second mounting foot adjustably connected to said second frame member, wherein said male coupling portion interlocks said first frame member female receiving portion and said second frame member female receiving portion in a location displaced from and located between said first and second mounting feet; and wherein said first mounting foot enables independent adjustment of a position of said first frame member in a Z dimension relative to a position of said second frame member, said first frame member photovoltaic laminate defining a skyward facing plane and said Z dimension measured perpendicular to said skyward facing plane.

118. A photovoltaic module array comprising:

a first frame member enclosing a single photovoltaic laminate, said first frame member having a plurality of side wall portions each having a top portion, bottom portion, inside surface, and outside surface, said inside surface including a recess for capture of said photovoltaic laminate, at least one of said side wall portions including at least one interlocking portion comprising a female receiving portion integrated into said outside surface;

a second frame member enclosing a single photovoltaic laminate, said second frame member having a plurality of side wall portions each having a top portion, bottom portion, inside surface, and outside surface, said inside surface including a recess for capture of said photovoltaic laminate, at least one of said side wall portions including at least one interlocking portion comprising a female receiving portion integrated into said outside surface;

a discrete male coupling portion interlocking said first frame member female receiving portion and said second frame member female receiving portion;

wherein said first and second frame member side wall portions' outside surfaces each face a direction substantially opposite respective inside surfaces and comprise a length substantially parallel with a skyward facing plane of said photovoltaic laminate, said female receiving portions run substantially the entire length of said respective side wall portions, and said male coupling portion has a length substantially less than a length of one of said female receiving portions, thereby enabling said male coupling portion to be located at substantially any position along said length of said female receiving portion;

wherein said first frame member female receiving portion comprises an inside surface which positively engages an outside surface of said male coupling portion to resist said downward force on said second frame member.

119. The photovoltaic module array of claim 118 wherein said photovoltaic module array comprises a height-adjustable foot portion.

120. The photovoltaic module array of claim 118 wherein said photovoltaic module array is mounted to a roof in a strutless configuration, said strutless configuration not having two or more struts fully spanning across said first and second frame members.

121. The photovoltaic module array of claim 118 wherein said photovoltaic module array further comprises a mounting foot connected to said first frame member and installed positions of said mounting foot and said male coupling portion are independently adjustable laterally relative to said first frame member.

122. The photovoltaic module array of claim 118 wherein said male coupling portion interlocks said first and second frame members such that a first downward force exerted on said first frame member at a point directly above said male coupling portion causes said male coupling portion to exert a second downward force on said second frame member, wherein said point and a midpoint of a length of said coupling are on a line perpendicular to said length of said coupling, said length of said coupling measured parallel with a length of said first frame member female receiving portion and in a plane substantially parallel with said skyward facing plane of said first frame member photovoltaic laminate.

123. The photovoltaic module array of claim 122 wherein said first downward force is a gravitational force.

124. The photovoltaic module array of claim 122 wherein said first downward force is due to wind.

125. The photovoltaic module array of claim 118 wherein said male coupling portion interlocks said first and second frame members such that said downward force exerted on said second frame member near said male coupling portion is distributed between said first and second frame members.

126. The photovoltaic module array of claim 118 wherein said male coupling portion interlocks said first and second frame members such that said first frame member non-negligibly contributes to a resistance of a downward force exerted on said second frame member near said male coupling portion.

127. The photovoltaic module array of claim 118 wherein said discrete male coupling portion interlocks said first frame member female receiving portion and said second frame member female receiving portion to form an elevated and completely connected array structure on top of a roofing surface, said first and second photovoltaic modules located immediately above and off of said roofing surface, said roofing surface forming part of a weather-tight skin of a building, extending from at least a ridge of said roof beneath said first frame member to a gutter of said roof, and comprising at least one of a shingle, a tile, and a shake; and wherein said photovoltaic module array further comprises an attachment portion penetrating through said roofing surface to attach said first frame member to said building.

128. The photovoltaic module array of claim 118 wherein said photovoltaic module array further comprises a first mounting foot adjustably connected to said first frame member and a second mounting foot adjustably connected to said second frame member, wherein said male coupling portion interlocks said first frame member female receiving portion and said second frame member female receiving portion in a location displaced from and located between said first and second mounting feet; and wherein said first mounting foot enables independent adjustment of a position of said first frame member in a Z dimension relative to a position of said second frame member, said first frame member photovoltaic laminate defining a skyward facing plane and said Z dimension measured perpendicular to said skyward facing plane.

129. The photovoltaic module array of claim 118 wherein said photovoltaic module array is fully installed and said male coupling portion is not secured to any supporting structure beneath said coupling.

130. A photovoltaic module array comprising:

a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface;

a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface; and a discrete male coupling portion interlocking said first frame member female receiving portion and said second frame member female receiving portion;

wherein said first and second frame member side wall portions' outside surfaces each face a direction substantially opposite respective inside surfaces and comprise a length substantially parallel with a skyward facing plane of said photovoltaic laminate, and said male coupling portion has a length substantially less than a length of one of said female receiving portions;

wherein said first frame member female receiving portion comprises an inside surface which positively engages an outside surface of said male coupling portion to resist a downward force on said second frame member.

131. A photovoltaic module array comprising:

a first frame member enclosing a single photovoltaic laminate, said first frame member having a plurality of side wall portions each having a top portion, bottom portion, inside surface, and outside surface, said inside surface including a recess for capture of said photovoltaic laminate, a first sidewall portion of said side wall portions including at least one interlocking portion comprising a first frame member female receiving portion integrated into said outside surface, a second sidewall portion of said sidewall portions orthogonally connected to said first sidewall portion and including at least one interlocking portion comprising a first frame member orthogonal female receiving portion;

a second frame member enclosing a single photovoltaic laminate, said second frame member having a plurality of side wall portions each having a top portion, bottom portion, inside surface, and outside surface, said inside surface including a recess for capture of said photovoltaic laminate, at least one of said side wall portions including at least one interlocking portion comprising a female receiving portion integrated into said outside surface;

a third frame member enclosing a single photovoltaic laminate, said first frame member having a plurality of side wall portions each having a top portion, bottom portion, inside surface, and outside surface, said inside surface including a recess for capture of said photovoltaic laminate, at least one of said side wall portions including at least one interlocking portion comprising a female receiving portion integrated into said outside surface;

a first discrete male coupling portion interlocking said first frame member female receiving portion and said second frame member female receiving portion, wherein said first frame member female receiving portion comprises a first inside surface portion which positively engages an outside surface of said first male coupling portion to resist a downward force on said second frame member; and a second discrete male coupling portion interlocking said first frame member orthogonal female receiving portion and said third frame member female receiving portion, wherein said first frame member orthogonal female receiving portion comprises a second inside surface portion which positively engages an outside surface of said second male coupling portion to resist a downward force on said third frame member.

132. A photovoltaic module array comprising:

a first photovoltaic module comprising a first frame member enclosing a single photovoltaic laminate, said first frame member having a plurality of side wall portions each having a top portion, bottom portion, inside surface, and outside surface, said inside surface including a recess for capture of said photovoltaic laminate, at least one of said side wall portions including at least one interlocking portion comprising a female receiving portion integrated into said outside surface;

a second photovoltaic module comprising a second frame member enclosing a single photovoltaic laminate, said second frame member having a plurality of side wall portions each having a top portion, bottom portion, inside surface, and outside surface, said inside surface including a recess for capture of said photovoltaic laminate, at least one of said side wall portions including at least one interlocking portion comprising a female receiving portion integrated into said outside surface; and a discrete male coupling portion interlocking said first frame member female receiving portion and said second frame member female receiving portion, wherein said first frame member female receiving portion comprises an inside surface which positively engages an outside surface of said male coupling portion to resist a downward force on said second frame member; and a mechanism that mounts said array on top of a roof of a building without said modules (a) being integrated into the roof and (b) forming a part of the weather-tight skin of the building;

wherein said first and second photovoltaic modules are removably interlocked and said mechanism mounts said modules adjustably in X, Y, and Z dimensions above and relative to a given position of said roof, said mechanism comprising foot portions to adjust a height of said array on top of the roof, said foot portions adjustably connecting directly to said modules.

133. The photovoltaic module array of claim 132 wherein said mechanism uses discrete male couplings to align said modules in a substantially coplanar layout and enables removal of said modules from said array individually, said male couplings mating disengage-ably with female channels integrated into all sides of each interlocked module.

134. A photovoltaic module array comprising:

a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, at least one of said side wall portions comprising a female receiving portion integrated into said outside surface;

a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, at least one of said side wall portions comprising a female receiving portion integrated into said outside surface;

a discrete male coupling portion laterally adjustably interlocking said first frame member female receiving portion and said second frame member female receiving portion in a first installed position; and a plurality comprising all discrete attachment portions laterally adjustably attaching said frame members to a support structure, a closest attachment portion of said plurality to said male coupling portion located closer to said male coupling portion than all other attachment portions in said plurality, said support structure supporting a roof;

wherein said male coupling portion is movable to a second installed position substantially laterally displaced from said first installed position while said closest attachment portion remains attached to said support structure, said male coupling portion laterally adjustably interlocking said first frame member female receiving portion and said second frame member female receiving portion in said second installed position; and wherein said first and second frame member side wall portions' outside surfaces each face a direction substantially opposite respective inside surfaces and comprise a length substantially parallel with a skyward facing plane of said photovoltaic laminate, and said male coupling portion has a length substantially less than a length of one of said female receiving portions; and wherein said first frame member female receiving portion comprises an inside surface which positively engages an outside surface of said male coupling portion to resist a downward force on said second frame member.

135. The photovoltaic module array of claim 134 wherein said roof comprises a roofing surface, said roofing surface forming part of a weather-tight skin of a building, extending from at least a ridge of said building beneath said first frame member to a gutter of said building, and comprising at least one of a shingle, a tile, and a shake; and wherein said support structure is a rafter and said attachment portion comprises a bolt, said bolt penetrating through said roof into said rafter.

136. A photovoltaic module array comprising:

a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, at least one of said side wall portions including at least one interlocking means comprising a female receiving portion integrated into said outside surface;

a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, at least one of said side wall portions including at least one interlocking means comprising a female receiving portion integrated into said outside surface; and a discrete male coupling portion interlocking said first frame member female receiving portion and said second frame member female receiving portion in a first position;

wherein said first and second frame member side wall portions' outside surfaces each face a direction substantially opposite respective inside surfaces and comprise a length substantially parallel with a skyward facing plane of said photovoltaic laminate, and said male coupling portion has a length substantially less than a length of one of said female receiving portions;

wherein said first frame member female receiving portion comprises an inside surface which positively engages an outside surface of said male coupling portion to resist a downward force on said second frame member; and wherein said first position of said male coupling portion is substantially laterally displaced from and laterally adjustable relative to a closest rafter of a plurality of rafters supporting a roof to said male coupling portion, said closest rafter extending in a direction substantially perpendicular to said length and closer to said male coupling portion than all other rafters of said plurality of rafters.

137. The photovoltaic module array of claim [135] *136* wherein said male coupling portion is laterally adjustable from said first position to said second position with said first frame member attached to said closest rafter, wherein said first frame member is attached to said closest rafter with a foot portion and said foot portion comprises a bolt penetrating said roof and attached to said closest rafter.

138. A photovoltaic module array comprising:

a first photovoltaic module having a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface;

a second photovoltaic module having a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface; and a discrete male coupling portion interlocking said first frame member female receiving portion and said second frame member female receiving portion and movably located in a laterally variable location along said first frame member female receiving portion, said laterally variable location movable relative to a nearest support structure connection point to said male coupling portion, said connection point closer to said male coupling portion than all other connection points to said support structure in said photovoltaic module array, said support structure located beneath said first frame member;

wherein said first and second frame member side wall portions' outside surfaces each face a direction substantially opposite respective inside surfaces and comprise a length substantially parallel with a skyward facing plane of said photovoltaic laminate, and said male coupling portion has a length substantially less than a length of one of said sidewall portions;

wherein said photovoltaic array is mounted to a roof in a strutless configuration and said first frame member female receiving portion comprises an inside surface which positively engages an outside surface of said male coupling portion to resist a downward force on said second frame member, said strutless configuration not having two or more struts running above a roofing surface of said roof and fully spanning across said first and second frame members.

139. The photovoltaic module array of claim 138 wherein said strutless configuration not having two or more struts spanning across said first and second frame members from a sidewall of said first photovoltaic module to a sidewall of said second photovoltaic module, said first photovoltaic module sidewall located on an opposite side of said first module than said first photovoltaic module female receiving portion, said second photovoltaic module sidewall located on an opposite side of said second photovoltaic module than said second photovoltaic module female receiving portion.

140. The photovoltaic module array of claim 138 wherein said strutless configuration further does not comprise separate foot-type pieces attached to said struts.

141. A photovoltaic module array comprising: (a) a plurality of photovoltaic modules; and (b) a plurality of coupling members; wherein each photovoltaic module comprises an integral frame member enclosing a single photovoltaic laminate, said frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface, a first coupling member of said coupling members interlocking a first frame member of a first photovoltaic module of said plurality of photovoltaic modules and a second frame member of a second photovoltaic module of said plurality of photovoltaic modules and comprising at least two male portions, a first male portion being inserted into the frame member female receiving portion of said first photovoltaic module, and a second male portion being inserted into the frame member female receiving portion of said second photovoltaic module, such that a downward force exerted on said second frame member near said male coupling portion is distributed between said first frame member and said second frame member; wherein said first frame member female receiving portion comprises an inside surface which positively engages an outside surface of said male coupling portion to resist said downward force on said second frame member.

142. A photovoltaic module array comprising: (a) a plurality of photovoltaic modules; and (b) a plurality of coupling members; wherein each photovoltaic module comprises an integral frame member enclosing a single photovoltaic laminate, said frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface, a first coupling member of said coupling members interlocking a first frame member of a first photovoltaic module of said plurality of photovoltaic modules and a second frame member of a second photovoltaic module of said plurality of photovoltaic modules and comprising at least two male portions, a first male portion being inserted into the frame member female receiving portion of said first photovoltaic module, and a second male portion being inserted into the frame member female receiving portion of said second photovoltaic module, such that a first downward force exerted on said first frame member at a point directly above said male coupling portion causes said male coupling portion to exert a second downward force on said second frame member; wherein said first frame member female receiving portion comprises an inside surface which positively engages an outside surface of said male coupling portion to resist said first downward force on said second frame member.

143. The photovoltaic module array of claim 142 wherein said point and a midpoint of a length of said coupling are on a line perpendicular to a length of said coupling, said length of said coupling measured parallel with a length of said first frame member female receiving portion and in a plane substantially parallel with a skyward facing plane of said first frame member photovoltaic laminate.

144. A photovoltaic module array comprising:

a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, at least one of said side wall portions including at least one interlocking means comprising a female receiving portion integrated into said outside surface;

a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, at least one of said side wall portions including at least one interlocking means comprising a female receiving portion integrated into said outside surface;

a discrete male coupling portion interlocking said first frame member female receiving portion and said second frame member female receiving portion, an installed position of said male coupling portion movably located at a variable location along said first frame member female receiving portion to vary a distance from a closest connection point to a support structure, said closest connection point being (a) one of a plurality of connection points comprising all connection points where said frame members connect to said support structure, said connections to said support structure including penetrations through a roofing surface and (b) closer to said male coupling portion than all other connection points of said plurality of connection points; and wherein said first and second frame member side wall portions' outside surfaces each face a direction substantially opposite respective inside surfaces and comprise a length substantially parallel with a skyward facing plane of said photovoltaic laminate, and said male coupling portion has a length substantially less than a length of one of said female receiving portions;

wherein said first frame member female receiving portion comprises an inside surface which positively engages an outside surface of said male coupling portion to resist a downward force on said second frame member;

wherein said first frame member and photovoltaic laminate form a first photovoltaic module and said connection point to said support structure further includes a mounting foot positioning said first photovoltaic module off of said roofing surface and attaching said first frame member to said support structure; and wherein installed positions of said mounting foot and said male coupling portion are independently adjustable laterally relative to said first frame member.

145. A photovoltaic module array comprising: (a) a plurality of photovoltaic modules; and (b) a plurality of coupling members; wherein each photovoltaic module comprises an integral frame member enclosing a single photovoltaic laminate, said frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface, a first coupling member of said coupling members interlocking a first frame member of a first photovoltaic module of said plurality of photovoltaic modules and a second frame member of a second photovoltaic module of said plurality of photovoltaic modules and comprising at least two male portions, a first male portion being inserted into the frame member female receiving portion of said first photovoltaic module, and a second male portion being inserted into the frame member female receiving portion of said second photovoltaic module, such that said first frame member and said second frame member both resist a substantially downward force exerted on said second frame member near said male coupling portion; wherein said first frame member female receiving portion comprises an inside surface which positively engages an outside surface of said male coupling portion to resist said downward force on said second frame member;

wherein said first frame member comprises a height-adjustable foot portion for supporting said first frame member, said height-adjustable foot portion comprising a threaded height adjustment mechanism, said threaded height adjustment mechanism being operable from a position substantially above said female receiving portions of said first and second frame members in said photovoltaic module array.

146. A photovoltaic module array comprising:

a first frame member enclosing a single photovoltaic laminate, said first frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface;

a second frame member enclosing a single photovoltaic laminate, said second frame member having a plurality of side wall portions each having a top portion, bottom portion, inside surface, and outside surface, said inside surface including a recess near said top portion for capture of said photovoltaic laminate, at least one of said side wall portions including at least one interlocking portion comprising a female receiving portion integrated into said outside surface; and a discrete male coupling portion interlocking said first frame member female receiving portion and said second frame member female receiving portion, such that (i) a downward load exerted on said second frame member near said male coupling portion is distributed through said coupling to said first frame member and (ii) an inside surface of said first frame member female receiving portion positively engages an outside surface of said male coupling portion to resist said downward load;

wherein said photovoltaic module array further comprises a plurality of height-adjustable foot portions.

147. The photovoltaic module array of claim 20 wherein said photovoltaic module array is retrofitted on top of said roofing surface and said roofing surface, in a substantially similar form and prior to installation of said photovoltaic module array, previously formed a part of said weather-tight skin of said building.

148. The photovoltaic module array of claim 20 wherein said foot portion enables independent adjustment of a position of said first frame member in a Z dimension relative to a position of said second frame member.

149. The photovoltaic module array of claim 20 wherein said attachment portion elevates said array structure to create an open space or unfilled area between said roofing surface and a portion of said first photovoltaic module closest to said roofing surface.

150. The photovoltaic module array of claim 20 wherein said array structure is elevated to allow water to flow beneath said first and second frame members.

151. The photovoltaic module array of claim 20 wherein said roofing surface sheds water away from an inside of said building.

152. The photovoltaic module array of claim 33 wherein an open area in a region where said photovoltaic module is off of said support structure allows for airflow between said first frame member and said support structure.

153. The photovoltaic module array of claim 33 wherein said photovoltaic module array is retrofitted on top of an existing roofing surface without removing said roofing surface, said roofing surface comprising at least one of a shingle, a tile, and a shake.

154. The photovoltaic module array of claim 46 wherein said self-locking coupling portion is removable from the top by moving laterally.

* * * * *